US006052103A

United States Patent [19]

Fujiwara et al.

[11] Patent Number: 6,052,103

[45] Date of Patent: Apr. 18, 2000

[54] LIQUID-CRYSTAL DISPLAY DEVICE AND DRIVING METHOD THEREOF

[75] Inventors: Hisao Fujiwara, Yokohama; Haruhiko Okumura, Fujisawa; Hitoshi Kobayashi, Yokohama, all of Japan

[73] Assignee: Kabushiki Kaisha Toshiba, Kawasaki, Japan

[21] Appl. No.: 08/939,719

[22] Filed: Sep. 29, 1997

[30] Foreign Application Priority Data

Sep. 30, 1996 [JP] Japan .................................... 8-259860

[51] Int. Cl.[7] .............................. G09G 3/36; C09K 19/02

[52] U.S. Cl. ............................ 345/89; 349/168; 349/169; 349/175; 349/185

[58] Field of Search ................................. 345/87, 55, 89, 345/95, 98, 99, 204, 209, 213, 507; 349/182, 74, 168, 177, 33, 35, 169, 175, 176, 185

[56] References Cited

U.S. PATENT DOCUMENTS

| | | | |
|---|---|---|---|
| 5,422,033 | 6/1995 | Mochizuki et al. | 349/168 |
| 5,453,863 | 9/1995 | West et al. | 349/35 |
| 5,570,216 | 10/1996 | Lu et al. | 349/175 |
| 5,574,593 | 11/1996 | Wakita et al. | 349/74 |
| 5,661,533 | 8/1997 | Wu et al. | 349/169 |
| 5,694,145 | 12/1997 | Kondo et al. | 345/98 |
| 5,695,682 | 12/1997 | Doane et al. | 349/169 |
| 5,748,277 | 5/1998 | Huang et al. | 349/169 |
| 5,889,566 | 3/1999 | Wu et al. | 345/98 |
| 5,894,297 | 4/1999 | Mizutome et al. | 345/99 |

OTHER PUBLICATIONS

M. Pfeiffer, et al., “Late–News Paper: A High–Information–Content Reflective Cholesteric Display,” Society For Information Display International Symposium Digest Of Technical Papers, (1995), pp. 706–709.

*Primary Examiner*—Steven J. Saras
*Assistant Examiner*—Paul A. Bell
*Attorney, Agent, or Firm*—Oblon, Spivak, McClelland, Maier & Neustadt, P.C.

[57] ABSTRACT

A liquid crystal device comprises plural pixel electrodes arranged in a matrix form, a common electrodes facing the pixel electrodes, a liquid crystal layer sandwiched therebetween, and plural switches to drive the respective pixel electrodes. A reflectivity or transmittance of the liquid crystal varies according to a first state where a direction of a normal to each of the liquid crystal is the same, a second state where the above direction of the normal is at random, and a third state where a spiral structure of the liquid crystal is untied, and has a hysteresis characteristics with respect to an applied voltage including an insensitive voltage region where a reflectivity or transmission state is not determined by the applied voltage. The device has an operation such that the applied voltage is brought into the insensitive voltage region, after a display signal is written into the pixel electrode, to hold the display state.

22 Claims, 15 Drawing Sheets

LIQUID-CRYSTAL DISPLAY DEVICE AND DRIVING METHOD THEREOF

BACKGROUND OF THE INVENTION

This invention relates to a liquid-crystal display device and a driving method thereof, and more particularly to a liquid-crystal display device using a liquid-crystal materiel with a hysteresis characteristic, such as cholesteric liquid crystal, and a driving method thereof.

There have been liquid-crystal display cells using liquid-crystal material (Polymer Stabilized Cholesteric Texture: PSCT) obtained by distributing a polymer in cholesteric liquid crystal to stabilize the displaying state. An example of driving cells of this type by a simple-matrix display method to effect memory display will be explained (reference: M. Pfeiffer et al. "A High-Information-Content Reflective Cholesteric Display," SID '95 Digest pp. 706–709).

FIG. 1 shows the reflectivity after a pulse voltage has been applied to PSCT liquid-crystal cells.

In the planar state indicated by P, cholesteric liquid-crystal molecules form domains with the direction of the normal to the twist of each domain being the same. With the planar state, a specific wavelength determined by the pitch of the twists in liquid-crystal molecules is reflected, resulting in a high reflectivity. With the focal conic state represented by $f_c$, the direction of the normal to the twists in the cholesteric liquid crystal is at random, which causes the light incident on the liquid-crystal panel to scatter, making the reflection intensity lower.

As seen from FIG. 1, both of the planar state and the focal conic state can exist in the area where the applied voltage is low. This means that liquid-crystal molecules can take two stable states without an external electric field and that the liquid crystal itself has memorizing capability, which makes it possible to make a display.

In FIG. 1, the voltages ranging from 0 to V1 are the insensitive voltage region where the initial state remains unchanged before a voltage pulse is applied. The voltages ranging from V1 to V2 are the intermediate voltage region where the planar state (P state) in the initial state changes to the focal conic state ($f_c$ state), with the liquid-crystal molecules presenting the P state and the liquid-crystal molecules presenting the $f_c$ state being distributed at a certain probability according to the cell structure and applied voltage. The voltages ranging from V2 to V3 are the region presenting the $f_c$ state, regardless of the initial state. With the homeotropic state represented by H with the voltages equal to or higher than V4, the helical structure of the liquid crystal has been untied. After being applied with a pulse voltage equal to or higher than V4, the liquid crystal returns to the P state, resulting in a higher reflection intensity. Like the voltages ranging from V1 to V2, the voltages ranging from V3 to V4 are the intermediate voltage region where the P state further changes to the $f_c$ state.

Now, a case where a liquid-crystal panel using the PSCT is driven by a simple-matrix display method will be described by reference to the waveform diagram of FIG. 2 and the circuit diagram of FIG. 3.

In FIG. 2, signal Rv is a signal applied to the liquid-crystal layer by a Y driver 24 of FIG. 3. Signal Sv is a signal applied to the liquid-crystal layer by an XU driver 25*a* or an XD driver 25*b*. The liquid-crystal layer 21 at the intersection of a scanning line 22 and a signal line 23 forms a single pixel. The pixel voltage applied to the liquid-crystal layer 21 is Vpix of FIG. 2.

Specifically, signal Rv has the waveform of the scanning signal applied to the direction of row to scan the pixels arranged in a matrix. Signal Sv has the waveform of a display signal applied in the direction of column of pixels to determine whether to bring the pixels to which the scanning signal is being applied into the P state (selected state) or the $f_c$ state (unselected state). The scanning signal is in the "0" state for the pixels not to be scanned.

The phase of the select signal shifts from that of the unselect signal by 180°. To change the display state in the selected state or memory state to the P state, the display signal Sv is applied so that the phase of Rv may be the reverse of that of Sv. To change the display state in the unselected state or memory state to the $f_c$ state, the display signal Sv is applied so that the phase of Rv may be the same as that of Sv.

If the display signal voltage is Vcol and the scanning signal voltage is Vrow, the relationship between the voltage of the scanning signal and that of the display signal has only to fulfill the following:

$$(V4-V3)<Vcol<V1$$

$$(2V3-V4)<Vrow<V3$$

In this case, the voltage of a selected pixel is V4 or higher and the voltage of an unselected pixel is V2 or higher but is less than V3.

Therefore, regardless of whether the initial state is in P or $f_c$, driving the pixels under the above conditions causes the selected pixel to change its state from the initial state through H to P and goes into the memory state (in the voltage range from 0 to V1). The driving also causes the unselected pixels to change their state from $f_c$ in the voltage-applied state (in the voltage range from V2 to V3) to $f_c$ in the memory state (in the voltage range of 0 to V1) and goes into the memory state. It should be noted that when the initial state is $f_c$, changing the state to P involves passing through H.

When the simple-matrix display method is used to make a display, the following problems arise.

A first problem is that the time required to rewrite the image on the screen is long. When the PSCT is used, the response time needed for the transition from P to $f_c$ or from H to P is at least several milliseconds of time. Therefore, in the case of 1000 scanning lines, for example, it takes at least several seconds to rewrite the entire screen. The cause of the problem is ascribed largely to driving the simple-matrix liquid-crystal device line by line.

For example, when the initial state is P or $f_c$ and the next state is made P, the initial state is changed to H once and thereafter is changed to P again. Therefore, after the time is allowed to elapse to let a voltage of V4 or higher be applied to change the state to H, it is necessary to secure time to change the state to P again, which requires a lot of time.

A second problem is that the power consumption is great. A voltage of V4 or higher to change the state to H must be applied before the final voltage of "0" to change the state to P is applied. To do this, the signal line has to be charged and discharged at a voltage of Vcol. Namely, the signal line is charged and discharged at the doubled frequency. The doubled frequency doubles the power consumption, resulting in an increase in the power consumption.

A third problem is that a high-quality display is difficult to achieve. With a liquid-crystal display device using cholesteric liquid crystal, the H state in which the spiral structure has been untied has the highest transmittance. Providing an optical absorption layer under the liquid-crystal layer makes the absorbance higher that in the $f_c$ state. In the case of simple-matrix driving, however, the H state cannot be maintained, so that the high absorption state cannot be realized. Consequently, a high-contrast display with P and H cannot be made, making it difficult to provide a high-quality display.

BRIEF SUMMARY OF THE INVENTION

The object of the present invention is to provide a liquid-crystal display device capable of shortening the rewriting time, the reduction of the power consumption, and an improvement in the display quality and a driving method thereof.

The foregoing object is accomplished by providing a liquid-crystal display device comprising: a first substrate having a first main surface; a plurality of pixel electrodes arranged in rows and columns on the first main surface of the first substrate; a second substrate that has a second main surface and is provided so that the second main surface faces the first main surface of the first substrate; a common electrode that is formed on the second main surface of the second substrate and has a portion facing the plurality of pixel electrodes; a liquid-crystal layer which is sandwiched between the plurality of pixel electrodes and the common electrode, whose reflectivity or transmittance varies according to a first state where a direction of a normal to each twist of liquid crystal in the liquid crystal layer is the same, a second state where the direction of the normal to each twist of the liquid crystal is at random, and a third state where a spiral structure of the liquid crystal has been untied, whose reflectivity or transmittance with respect to an applied voltage presents a hysteresis characteristic, and which has an insensitive voltage region where the applied voltage is zero or in the vicinity of zero and a factor other than the applied voltage determines whether to take either the first state or the second state; a plurality of scanning lines formed on the first main surface of the first substrate so as to correspond to the rows; a plurality of signal lines formed on the first main surface of the first substrate so as to correspond to the columns; a plurality of switch elements provided at intersections of the plurality of scanning lines and the plurality of signal lines in a one-to-one ratio, each of the plurality of switch elements having a conducting path and a control terminal that controls conduction in the conducting path, one end of the conducting path being connected to a corresponding one of the plurality of signal lines, the other end of the conducting path being connected to a corresponding one of the plurality of pixel electrodes, and the control terminal being connected to a corresponding one of the plurality of scanning lines; a plurality of capacitive elements one end of each of which is connected to the plurality of pixel electrodes in a one-to-one ratio; a plurality of storage capacitor lines formed so as to correspond to the rows, each of the plurality of storage capacitor lines being connected to the other end of each of the plurality of capacitive elements included in a corresponding one of the rows; a scanning-line driver for supplying a scanning signal to each of the plurality of scanning lines; a signal-line driver for supplying a display signal to each of the plurality of signal lines; and control means for controlling a potential of a corresponding one of the plurality of pixel electrodes so that the potential falls in an insensitive voltage region which is zero or in the vicinity of zero, after the display signal has been applied and written into the corresponding one of the plurality of pixel electrodes.

The liquid-crystal layer is formed of cholesteric liquid crystal and the first, the second, and the third state corresponds to a planar state, a focal conic state, and a homeotoropic state of the cholesteric liquid crystal in this order.

It is desirable that the control means controls a voltage of the scanning signal so that a time needed for a potential difference between a corresponding one of the plurality of pixel electrodes and the common electrode to fall within the insensitive voltage region is larger than a response time of the liquid crystal.

Specifically, it is desirable that the control means controls an impedance of the switch element by controlling a voltage of the scanning signal from the scanning-line driver.

It is desirable that the control means further includes switching means for bringing a corresponding one of the plurality of signal lines into a low impedance after the corresponding one of the plurality of signal lines has written the display signal into a corresponding one of the plurality of pixel electrodes.

The liquid-crystal display device further comprises a display synchronizing signal generator circuit for generating a specific synchronizing signal, wherein the signal-line driver outputs the display signal on a basis of the specific synchronizing signal, and the display synchronizing signal generator circuit stops an output of the synchronizing signal when the display signal remains unchanged for one frame or more, which causes the signal-line driver to stop an output of the display signal and the scanning-line driver to stop an output of the scanning signal, and then the display synchronizing signal generator circuit generates the specific synchronizing signal immediately when the display signal changes again, which causes the signal-line driver to start the output of the display signal again.

It is desirable that the liquid-crystal display device further comprises reset voltage applying means for applying a reset voltage for changing a state of the liquid-crystal layer to the third state to the plurality of storage capacitor lines for a time equal to or longer than a response time of the liquid crystal during an active period of the synchronizing signal, starting at a beginning of the period.

The signal-line driver may supply a reset voltage for changing a state of the liquid-crystal layer to the third state and thereafter supply an arbitrary voltage for changing the state of the liquid-crystal layer to the second state during an active period of the scanning signal.

The signal-line driver may bring the display signal into the insensitive voltage region after the liquid-crystal layer has been changed to the second state.

The signal-line driver may supply a reset voltage for changing a state of the liquid-crystal layer to the third state and thereafter supply an arbitrary voltage for changing the state of the liquid-crystal layer to the second state, and then bring the arbitrary voltage into the insensitive voltage region before the liquid-crystal layer has responded completely during an active period of the scanning signal.

The display signal which includes the same number of positive polarity peaks and negative polarity peaks may be applied to the pixel electrodes during an active period of the scanning signal.

The liquid-crystal display device may comprise a storage capacitor-line driver for supplying a reset voltage for bringing the liquid-crystal layer into the third state to each of the plurality of storage capacitor lines provided for each of the rows, wherein the reset voltage is supplied to the corresponding one of the plurality of storage capacitor lines immediately before the scanning signal is supplied to the corresponding one of the plurality of scanning lines.

Furthermore, the foregoing object is also accomplished by providing a method of driving a liquid-crystal display device comprising: a plurality of pixel electrodes arranged in rows and columns; a common electrode facing the plurality of pixel electrodes; a liquid-crystal layer which is sandwiched between the plurality of pixel electrodes and the common electrode, whose reflectivity or transmittance varies according to a first state where a direction of a normal to each twist of liquid crystal in the liquid crystal layer is the same, a second state where the direction of the normal to each twist of the liquid crystal is at random, and a third state where a spiral structure of the liquid crystal has been untied, whose reflectivity or transmittance with respect to an applied voltage presents a hysteresis characteristic, and which has an insensitive voltage region where the applied voltage is zero or in the vicinity of zero and a factor other than the applied voltage determines whether to take either the first state or the second state; a signal-line driver for selecting the plurality of pixel electrodes column by column and supplying a display signal via a corresponding one of a plurality of signal lines, and a scanning-line driver for selecting the plurality of pixel electrodes row by row and driving corresponding switch elements with a scanning signal from the corresponding one of the plurality of scanning lines to apply the display signal to a corresponding one of the plurality of pixel electrodes, the method comprising: the step of causing the signal-line driver and the scanning-line driver to write the display signal into a corresponding one of the plurality of pixel electrodes; and the step of bringing a potential difference between the corresponding one of the plurality of pixel electrodes and the common electrode into the insensitive voltage region after the step of writing the display signal has been completed.

With the liquid-crystal display device and the driving method thereof, the display signal is written into a pixel electrode and the voltage of the written display signal is held. Because the liquid crystal is caused to respond to the held voltage, a high-speed writing operation is possible even if the response speed of the liquid crystal is slow, helping shorten the rewriting time.

Since the liquid-crystal layer has a hysteresis characteristic, a display is made with the liquid crystal in the memory state by bringing the potential difference between the pixel electrodes and the common electrode into the insensitive voltage region with voltages of 0V or in the vicinity of 0V after the display signal has been written into the pixel electrode. Therefore, maintaining the memory state reduces the number of times of rewriting, helping decrease the power consumption. When a display is made by active-matrix driving, a high-quality display can be achieved.

When cholesteric liquid crystal is used as the liquid-crystal layer, the liquid-crystal layer is maintained in the planar state (reflected state) or the focal conic state (scattered state) by bringing the potential difference between the pixel electrodes and the common electrode into the insensitive voltage region with voltages of 0V or in the vicinity of 0V.

Furthermore, the operation of bringing the potential difference between the pixel electrodes and the common electrode into the insensitive voltage region with voltages of 0V or in the vicinity of 0V is realized by leakage current, one of the elements constituting the liquid-crystal display device. The elements constituting the liquid-crystal display device include means for controlling the writing and holding of the signal in liquid-crystal layer and pixel electrodes, the materials forming the liquid-crystal cells, the circuit configuration, and the circuits constructing the liquid-crystal display device.

It is desirable that the operation of bringing the potential difference between the pixel electrodes and the common electrode into the insensitive voltage region should be carried out when the display signal inputted to the liquid-crystal display device remains unchanged for more than a specific period of time.

With the liquid-crystal display device and the driving method thereof, since the display signal for the first, second, or third state of the liquid-crystal layer is written into the pixel electrodes, a high-quality display capable of gray scale display can be made.

Furthermore, both polarities can be applied to the liquid-crystal layer equally by making the polarity of the display signal written into the pixel electrodes different before and after the display is brought into the memory state or during the period that the display signal is written into the pixel electrodes.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, embodiments of the present invention will be explained.

(First Embodiment)

Figure 1:
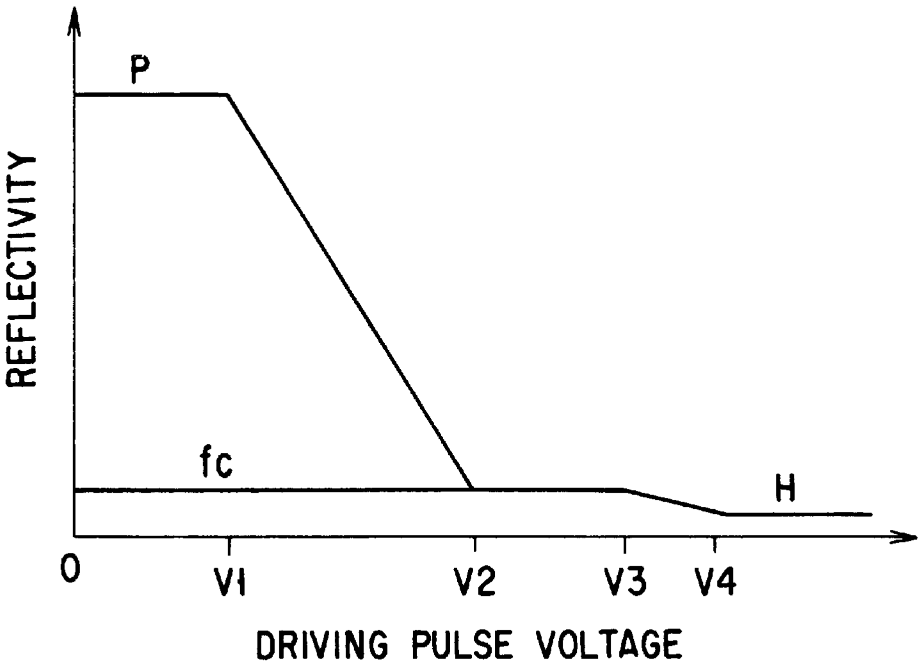
FIG. 1 PRIOR ART
FIG. 1 shows the relationship between the applied voltage and the reflectivity for cholesteric liquid crystal.
Figure 2:
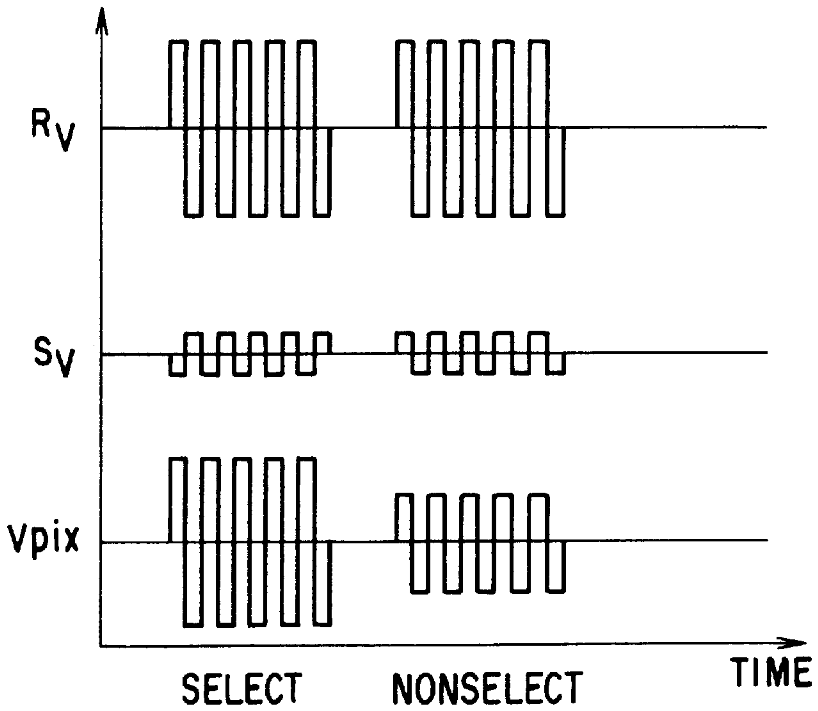
FIG. 2 PRIOR ART
FIG. 2 is a waveform diagram showing the relationship between the applied voltage and the pixel voltage when simple-matrix driving is done by conventional techniques.
Figure 3:
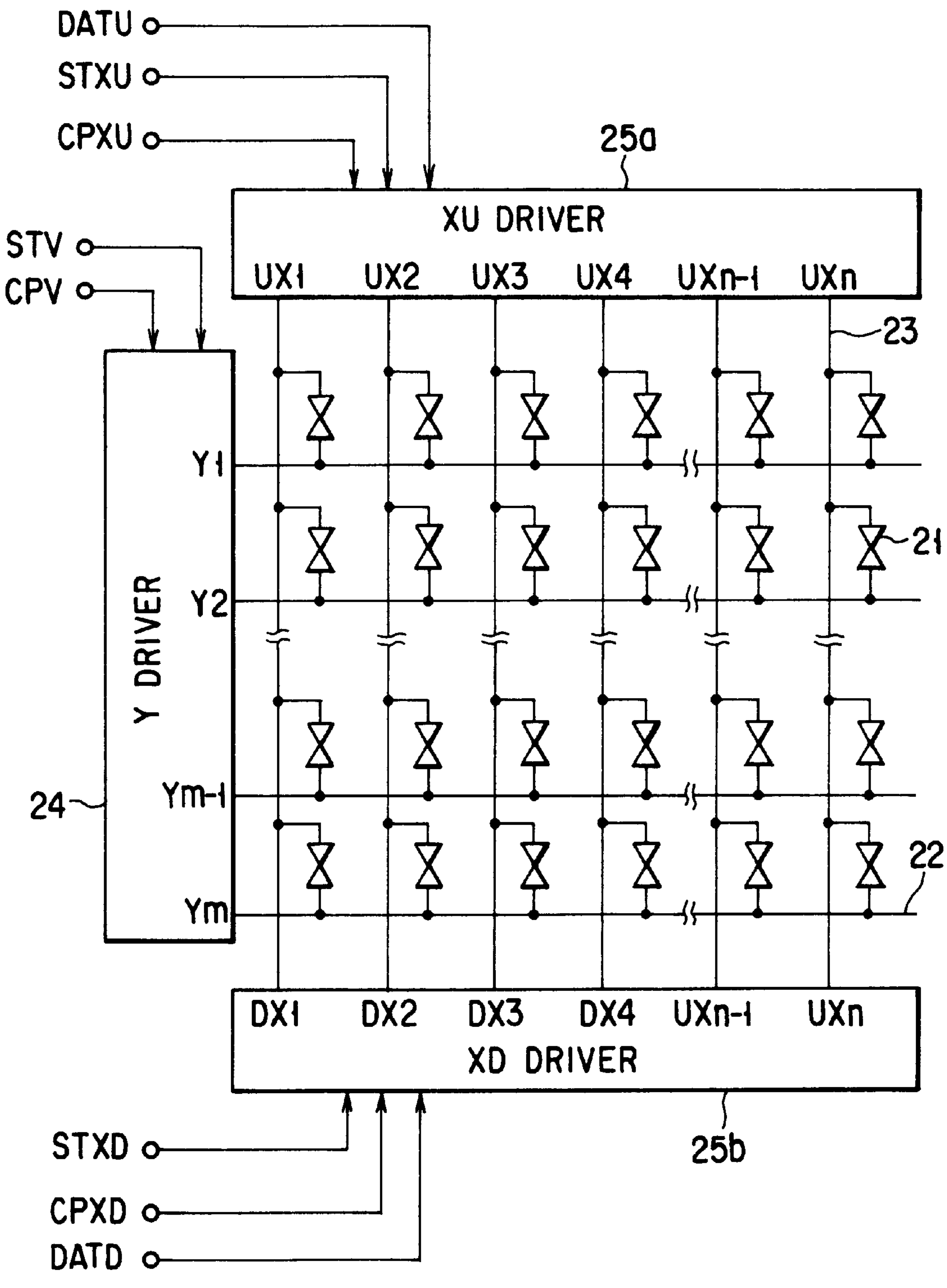
F I G. 3 PRIOR ART
FIG. 3 shows an example of the configuration of a liquid-crystal display device based on conventional simple-matrix driving.
Figure 4:
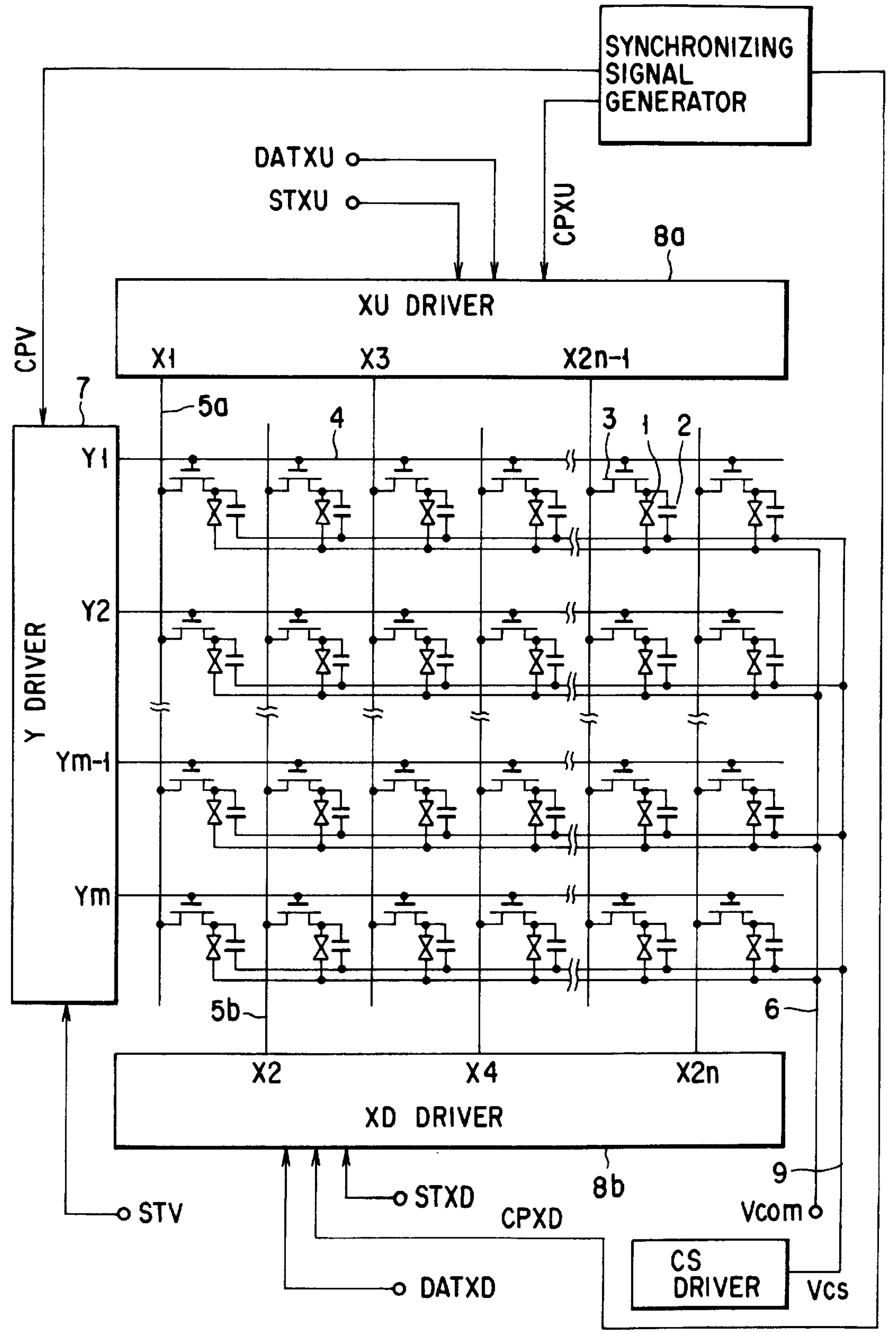
FIG. 4 shows the configuration of a liquid-crystal display device according to a first, third, and fourth embodiments of the present invention.

FIG. 4 shows the configuration of a liquid-crystal display device according to a first embodiment of the present invention. Reference numeral 1 indicates a liquid-crystal cell using liquid-crystal material (PSCT in the embodiment) having a cholesteric phase. Numeral 2 indicates a storage capacitor. Numeral 3 indicates a switching element using a TFT. To the drain of the TFT 3, a pixel electrode (not shown) of the liquid-crystal cell is connected. Numeral 4 represents a scanning line that connects the gate of each TFT 3 arranged in the direction of row. Reference symbols 5*a* and 5*b* denote signal lines that connect the source of each TFT arranged in the direction of column. Numeral 6 indicates a common line that supplies a common signal Vcom (normally, the ground potential) to the liquid-crystal cell 1. The common signal is supplied from a common electrode driving circuit (not shown). Numeral 7 denotes a Y driver (scanning-line driver) that supplies a scanning signal to the scanning line 4. Reference symbols 8*a* and 8*b* indicate an XU driver and an XD driver (signal-line driver) that supply a display signal to the signal lines 5*a* and 5*b*. Numeral 9 indicates a signal line that supplies a charge holding potential to the storage capacitor 2. Applying an erase signal to the signal line causes the display screen to be initialized (reset). It goes without saying that like an ordinary active matrix liquid-crystal panel, the pixel electrodes, storage capacitors 2, TFTs 3, scanning lines 4, and signal lines 5*a*, 5*b* are provided on one substrate, a common electrode is provided on the other substrate, and liquid crystal is sandwiched between the two substrates, thereby forming a plurality of liquid-crystal cells 1.

Next, the operation of the liquid-crystal display device of the first embodiment will be explained.

Figure 5:
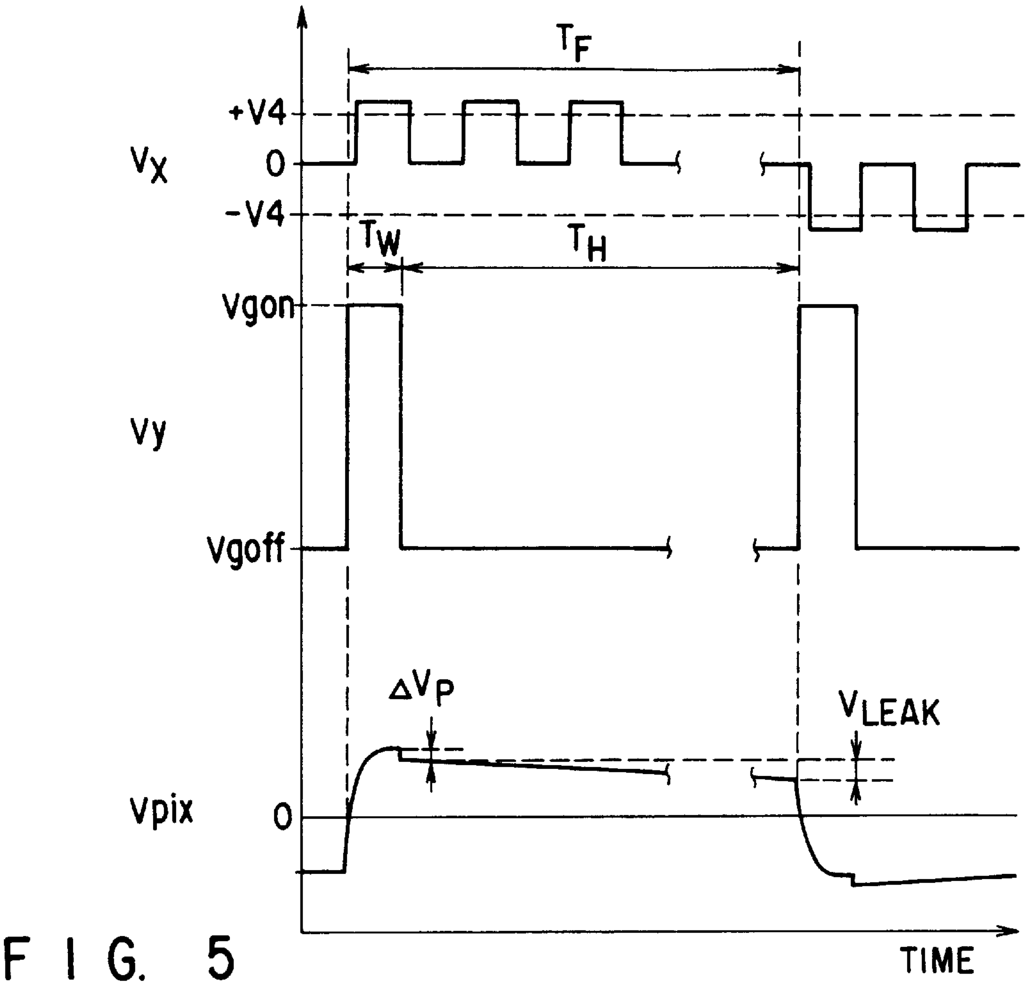
FIG. 5 shows waveforms at various sections when active matrix driving is done in the first embodiment.
Figure 6:
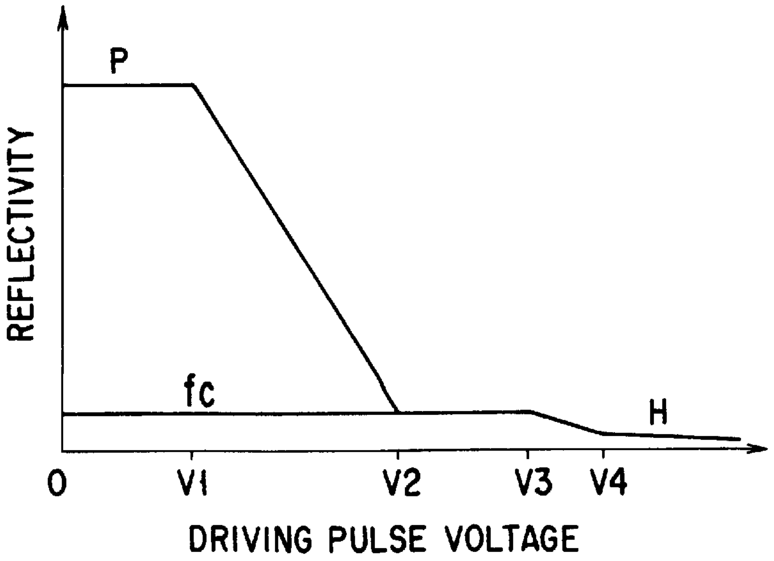
FIG. 6 shows the relationship between the applied voltage and the reflectivity for cholesteric liquid crystal.

FIG. 5 shows an output voltage waveform Vy from the Y driver 7 of FIG. 4, an output voltage waveform Vx from the XU driver 8*a* and XD driver 8*b*, and a voltage waveform Vpix applied to the liquid-crystal cells 1 between the pixel electrodes and the common electrode, using the same time scale. $T_F$ is a single frame period, $T_W$ is the writing period (scanning period) to a pixel electrode, and $T_H$ is the holding period of the display signal. FIG. 6 shows the relationship between the voltage applied to the pixels 1 and the reflectivity of the liquid-crystal layer.

When simple-matrix driving is done as described in the related techniques, displaying in the homeotoropic phase (H) cannot be done. Active matrix driving of the first embodiment, however, enables the voltage of the display signal to be applied to the liquid-crystal cells 1 continuously, making it possible to provide a display making use of the light-transmitting state of H. Specifically, providing an optical absorption layer under the liquid-crystal cells 1 makes it possible to provide a black display whose reflectivity is lower than the focal conic phase ($f_c$), or where the fading of black is suppressed.

The phenomenon that the reflectivity of H is lower than that of $f_c$ results from the operation of cholesteric liquid crystal and is characteristic of cholesteric liquid crystal. Specifically, with the $f_c$ state, the incident light is scattered and part of the scattered light returns to the incident side, preventing a complete black display from being made. In contrast, with the H state, since all the liquid-crystal molecules point completely in the direction of the electric field, almost all of the incident light pass through without scattering. By causing the optical absorption layer to absorb the penetrating light, it is possible to provide a black display without scattered light. A black display in the H state by active matrix driving this way enables a high contrast display.

Use of active matrix driving also helps shorten the driving time. As shown in FIG. 4, to each pixel electrode, the storage capacitor 2 is connected in parallel with the liquid-crystal cell 1. Even when the liquid-crystal cell cannot respond within the writing period (scanning period) Tw of FIG. 5, the liquid-crystal cell 1 can be driven by the display signal held in the storage capacitor 2, as long as the display signal can be written into the storage capacitor 2 within the writing period Tw. For Vpix of FIG. 5, $\Delta$Vp represents a voltage drop caused by the feed-through voltage.

As described above, the display signal can be written within the writing time Tw shorter than the response time of the liquid-crystal cell 1, which helps shorten the writing time remarkably as compared with simple-matrix driving. For example, if the number of scanning lines of the liquid-crystal panel is 1000, the response time of the liquid crystal is 3 ms, and the writing time Tw for charging the liquid-crystal cell 1 and storage capacitor 2 via the TFT 3 is 100 $\mu$s, simple-matrix driving will require three seconds of rewriting time, whereas active-matrix driving will require only 0.1 second of rewriting time. As described above, use of active-matrix driving shortens the rewriting time remarkably, which helps realize a comfortable user interface with a shorter user's waiting time.

The above explanation is based on the assumption that the display screen is rewritten every one frame period. Since the cholesteric liquid crystal has memorizing capability, when the display does not change every one frame, the number of times of rewriting can be reduced making use of the memorizing capability. Hereinafter, a case where a display is made making use of the memorizing capability will be explained. w When the display is changing constantly, the above-described active-matrix driving is effected. When the display remains unchanged, the mode changes to the memory mode. The memory mode is realized by stopping the operation of the Y driver 7. Specifically, the operation of the Y driver 7 can be stopped by stopping the start signal STV and clock signal CPV inputted to the Y driver 7. This is equivalent to a case where the holding period $T_H$ continues a long time in the active-matrix driving.

In usual active-matrix driving, too, the holding voltage drops during the holding period $T_H$ because of a leakage current in the TFT as shown by $V_{LEAK}$ of FIG. 5. When it is assumed that the holding period $T_H$ gets very long in the memory mode, the $V_{LEAK}$ will become very large and finally the voltage applied to the liquid-crystal cell will reduce to zero. Consequently, just stopping the operation of the Y driver 7 enables a leakage current in the liquid-crystal panel itself, such as a leakage current in the TFT, to change the mode to the memory mode easily.

Since an ordinary active-matrix panel is designed to have a small $V_{LEAK}$, the voltage of the display signal may be applied to the liquid-crystal cell 1 for as long as more than one second, depending on the holding characteristic of the panel. From the viewpoint of the reliability of liquid-crystal material, it is undesirable that a voltage with a single polarity should be applied continuously to the liquid-crystal cell 1 for such a long period. Therefore, it is desirable that a leakage current in the liquid-crystal panel should be a little large. Thus, it is considered that the voltage applied to the liquid-crystal layer 1 is made zero rapidly by positively making a leakage current in the TFT 3 larger in the memory mode. Hereinafter, a concrete method for obtaining such a state will be explained.

Figure 7:
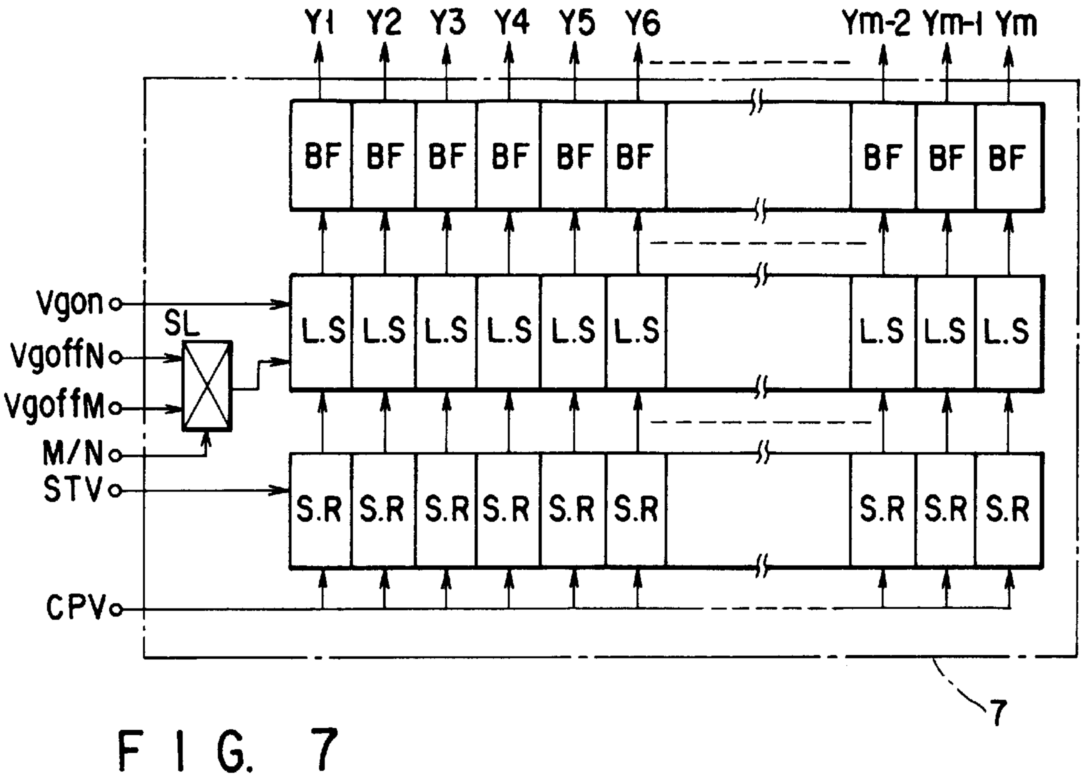
FIG. 7 is a detailed block diagram of the Y driver of FIG. 4 and its related circuit.

FIG. 7 shows an example of the configuration of the Y driver 7 for making a leakage current in the TFT 3 larger in the memory mode. Reference symbol SR indicates a shift register, LS a level shifter, and BF a buffer. The Y driver 7 is obtained by adding a select circuit SL for switching the voltage inputted to the level shifter LS between $V_{goffN}$ and $V_{goffM}$ to an ordinary Y driver. The select circuit L selects $V_{goffN}$ in the normal active-matrix driving and $V_{goffM}$ in the memory mode.

In this case, if the voltage of the display signal is Vsig, to make a leakage current during the holding period of the TFT 3 in the memory mode larger than that during the active-matrix driving, the setting is done as follows:

$$|Vsig - V_{goffN}| > |Vsig - V_{goffM}|$$

Figure 8:
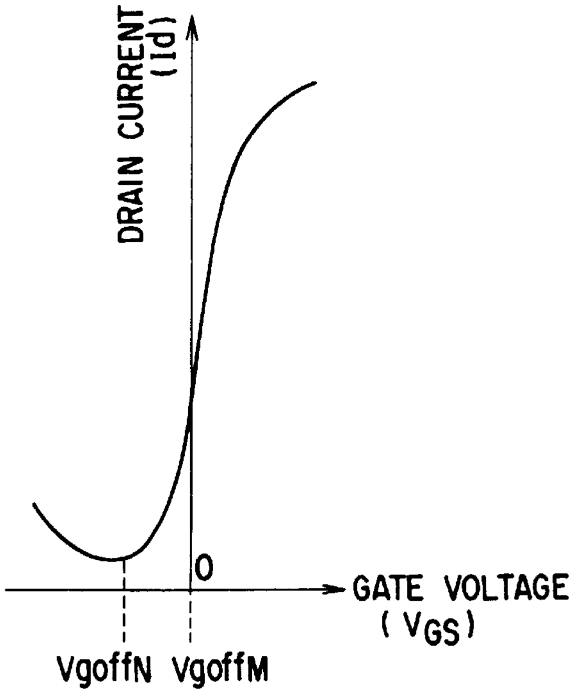
FIG. 8 is a characteristic diagram showing the relationship between the gate voltage and drain current of a TFT.

FIG. 8 shows the relationship between the gate-source voltage Vgs and the drain current Id in an ordinary TFT. In active-matrix driving, the gate-source voltage Vgs minimizing the drain current Id, or $V_{goffN}$, is used. To change the mode to the memory mode, the gate-source voltage Vgs making the drain current Id during the holding period larger than in the active-matrix driving, or $V_{goffM}$, is used.

When the voltage $V_{goffM}$ is made too large, however, this brings the TFT into the conducting state, which permits the large drain current Id, resulting in a rapid drop in the potential of the pixel electrode. When the potential of the pixel electrode has decreased to zero rapidly, the cholesteric liquid crystal in the homeotoropic phase (H) changes to the planar phase (P), not to the focal conic phase ($f_c$), preventing the black display state from being maintained.

To avoid this problem, if the response time of the liquid crystal is tic and the time during which the pixel potential is low due to the drain current (leakage current) at the time when the mode changes to the memory mode is $t_{memp}$, the value of the drain current, or the value of $V_{goffM}$ corresponding to the drain current, has to be set so that the following relation may hold:

$$t1c < t_{memp},$$

In this case, because the voltage applied to the liquid-crystal cell decreases gradually, the phase can change from the homeotoropic phase (H) to the focal conic phase ($f_c$), which allows the black display state in the homeotoropic phase (H) in the active-matrix driving to the black display in the focal conic phase ($f_c$) in the memory mode, enabling the black display to be maintained.

Because the drain current in the TFT when the mode changes to the memory mode flows from the pixel electrode to the signal line, the signal line or the signal-line driver have to be in a low impedance state. If it is not in a low impedance state, the potential of the signal line gets higher as the pixel potential goes lower. This makes the potential difference between the source and the drain smaller before the pixel potential has reduced to zero, which prevents the drain current from flowing sufficiently. As a result, the time needed to reduce the pixel potential to zero becomes longer, which decreases the reliability of the liquid-crystal material. To avoid this problem, the output of the signal-line driver should be brought into a low impedance state when the mode is changed to the memory mode.

Figure 9:
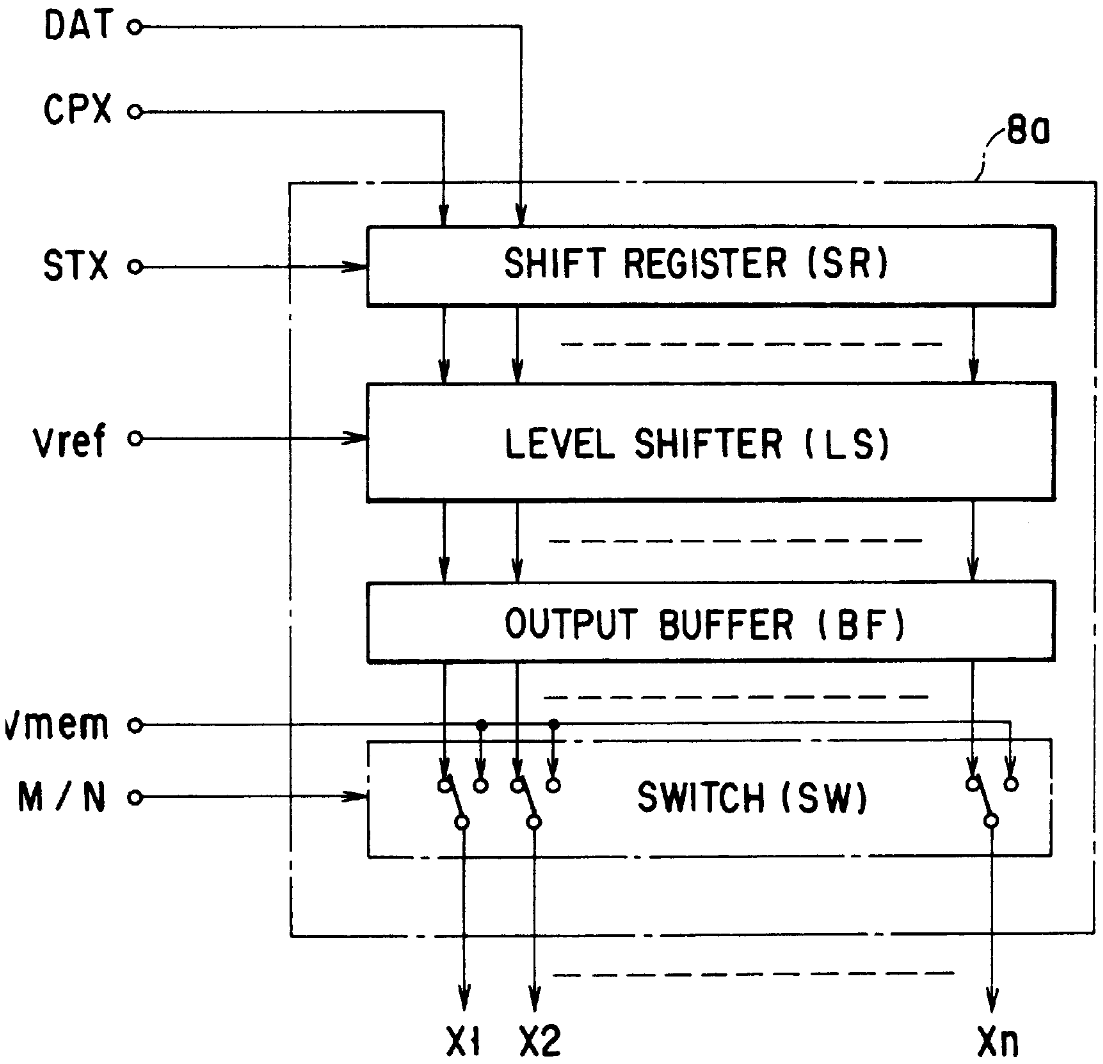
FIG. 9 is a detailed block diagram of the X driver of FIG. 4.

FIG. 9 shows an example of the configuration of the signal-line drivers (the XU driver 8*a* and XD driver 8*b*) to produce such a state. In the normal active-matrix driving, the voltage corresponding to the display data DAT is outputted from the level shifter LS and is supplied to the signal line via the output buffer BF and switch SW. To change to the memory mode, the switch SW chooses the memory-mode voltage source, not the output buffer BF. Usually, the potential Vmem of the memory-mode voltage source is set to the potential of the common electrode (normally, the ground potential). Namely, to change to the memory mode, the output of the signal-line driver goes into the grounded state of a low impedance, which decreases the pixel potential to zero in a suitable time.

The above explanation is about a case where the mode is changed from the active-matrix driving to the memory mode. Now, a case where the mode is changed from the memory mode to the active-matrix driving will be explained. When the active-matrix driving is being done, a display is made on the basis of the synchronizing signal for scanning the display screen. In the memory mode, the operation of the driver is stopped, the synchronizing signal has no connection with the display. Accordingly, when the mode returns to the active-matrix driving, a display can be made with the timing of a new synchronizing signal, regardless of the timing of the synchronizing signal before the mode changed to the memory mode.

Figure 10:
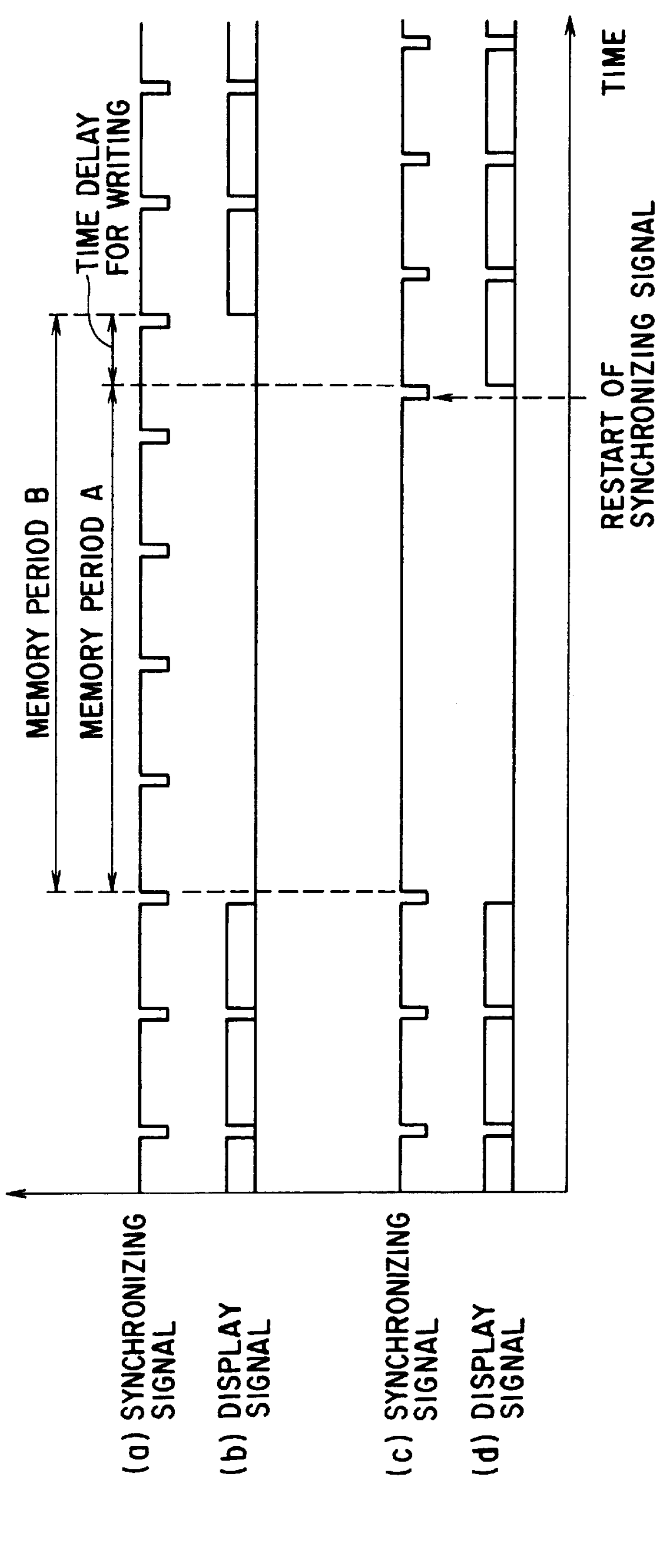
FIG. 10 is a timing chart for the comparison of a case where the synchronizing signal is stopped and a case the same signal is not stopped in the first embodiment.

FIG. 10 shows the comparison of a case where a display is made with the timing of a new synchronizing signal ((c) and (d) in FIG. 10) when the synchronizing signal is stopped in the memory mode and the mode is changed to the active-matrix driving with a case where a display is made without stopping the synchronizing signal even in the memory mode ((a) and (b) in FIG. 10).

When the synchronizing signal is stopped in the memory mode, the point in time when the display signal was rewritten on the system side is newly set as the beginning of the vertical blanking period of the synchronizing signal and the mode returns to the active-matrix driving. In contrast, when the synchronizing signal is not stopped in the memory mode, the display screen is updated from the frame next to the frame at the time when the display signal was rewritten on the system side, which delays the start of the rewriting accordingly.

As described above, when the synchronizing signal is stopped in the memory mode and the mode is changed to the active-matrix driving, the time required for rewriting can be shortened more in the case where a display is made with the timing of a new synchronizing signal than in the case where a display is made with the timing of the existing synchronizing signal. This provides the user with a comfortable environment with a short rewriting time.

When the liquid-crystal panel has a high resolution, the number of scanning lines is naturally large, so that the rewriting of a single screen requires more time. For example, if the number of scanning lines is 1000 and the writing time is 100 μs, it will take 0.1 sec to rewrite a single screen. As a result, there may be a case where the image before the rewriting and the image after the rewriting will be displayed simultaneously on the same screen.

Such a problem is overcome by a method of newly setting the point in time when the display signal was rewritten on the system side as the beginning of the vertical blanking period of the synchronizing signal and returning to the active-matrix driving.

Since a new synchronizing signal is produced at the beginning point of the vertical blanking period, there is as much time as the blanking period before the display data is actually written. In general, about 10% of the frame period is the vertical blanking period. In the above example, the vertical blanking period is about 10 ms. Therefore, if the response time of the liquid crystal is about 3 ms, the screen before the rewriting can be erased by changing the phase of the liquid crystal to the H phase once and thereafter changing the phase to the P phase again, which prevents the images before and after the rewriting from appearing simultaneously on the same screen.

Figure 11A:
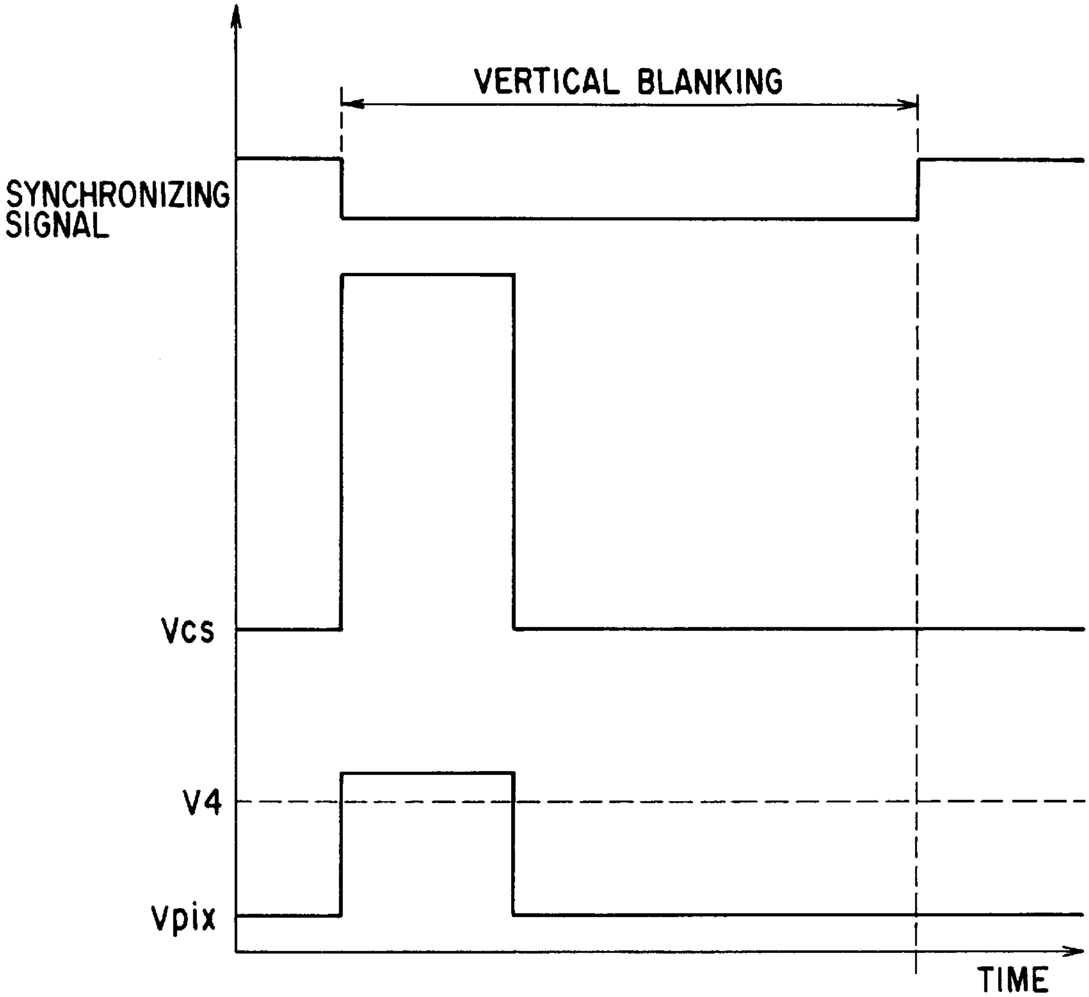
FIGS. 11A and 11B show waveforms at various sections when the erase signal is applied in the first embodiment.
Figure 11B:
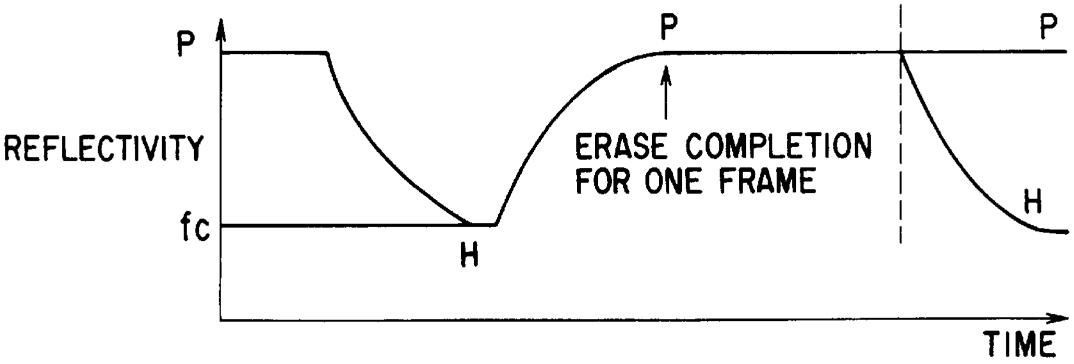

The all-screen in-unison erasure can be realized by supplying the erase signal Vcs to the erase signal line 9 of FIG. 4. FIGS. 11A and 11B are timing charts for the waveforms and reflectivity at various sections using the same time scale. As shown in FIGS. 11A and 11B, after the all-screen unison erasure, the liquid crystal is in the P phase and all of the screen has a higher reflectivity.

To carry out the all-screen in-unison erasure, the erase signal Vcs is applied at the beginning of the vertical blanking period. To change the phase of the liquid crystal to the H phase, the value of the erase signal Vcs is set so that the pixel electrode potential Vpix may be equal to or higher than the voltage V4 of FIG. 6. The pulse width of the erase signal Vcs is set so as to be equal to or longer than the response time during which the phase of the liquid crystal is changed to the H phase. When the voltage of the erase signal Vcs is returned to the original value instantly after the phase of the liquid crystal has changed to the H phase, this makes the liquid crystal change the phase from the H phase to the P phase, thereby effecting the all-screen in-unison erasure. In this way, the problem that the images before and after the rewriting are displayed on the same screen can be solved.

From the viewpoint of the reliability of the liquid crystal, it is desirable that the polarity of the erase signal Vcs for in-unison erasure should be such that both of the positive and negative polarities can be applied. For example, the unison erasure may be carried out using the erase signal Vcs whose polarity is the reverse of the polarity applied to the pixel in the memory mode.

While the above explanation is based on the assumption that the mode returns from the memory mode to the active-matrix driving, the in-unison erasure may be performed in the normal active-matrix mode.

Because the in-unison erasure initializes the display screen, it is unnecessary to change the phase of the pixel potential to the H phase each time scanning is done differently from the simple-matrix driving. This makes it possible to use a simple driving method, or an easy-to-control driver with a simple circuit structure, which enables the reduction of hardware.

(Second Embodiment)

When the screen is not erased before the display signal is written, it is necessary to change the phase of the liquid crystal to the H phase each time scanning is done and write the display signal again even when active-matrix driving is done. This causes the problem of making the driving time longer. A second embodiment of the present invention provides a method of solving the problem that the driving time gets longer.

Figure 12:
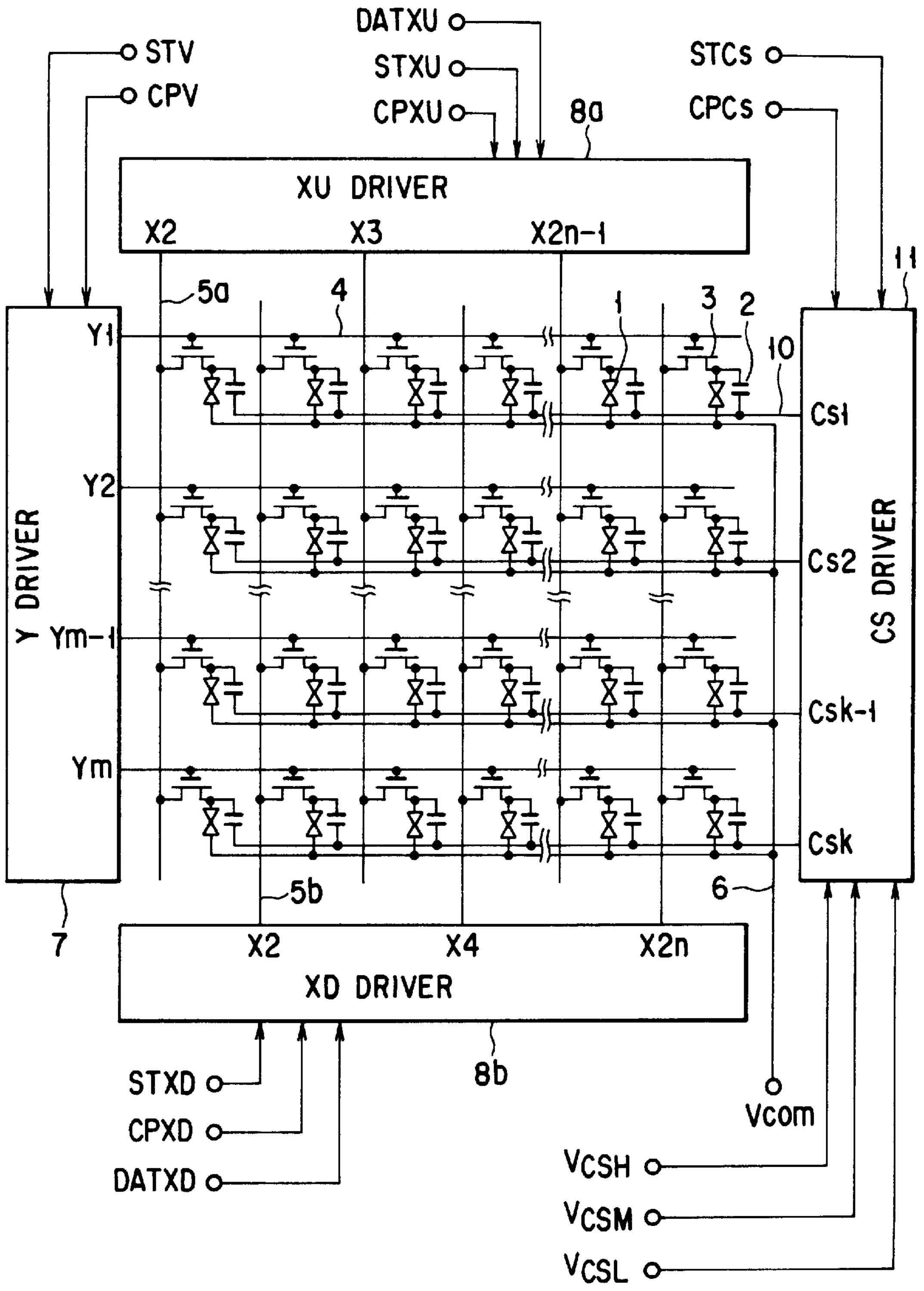
FIG. 12 shows the configuration of a liquid-crystal display device according to a second embodiment of the present invention.

FIG. 12 shows the configuration of a liquid-crystal display device according to the second embodiment. In the first embodiment of FIG. 4, the erase signal line supplying the erase signal $V_{CS}$ is common to the entire screen. In the example of FIG. 12, an erase signal line 10 is provided for each row and the erase signal Vcs is supplied from an erase-signal driver (CS driver) to each erase-signal line 10. The remaining basic configuration is the same as in FIG. 4. The corresponding parts are indicated by the same reference numerals and a detail explanation of them will not be given here.

Figure 13A:
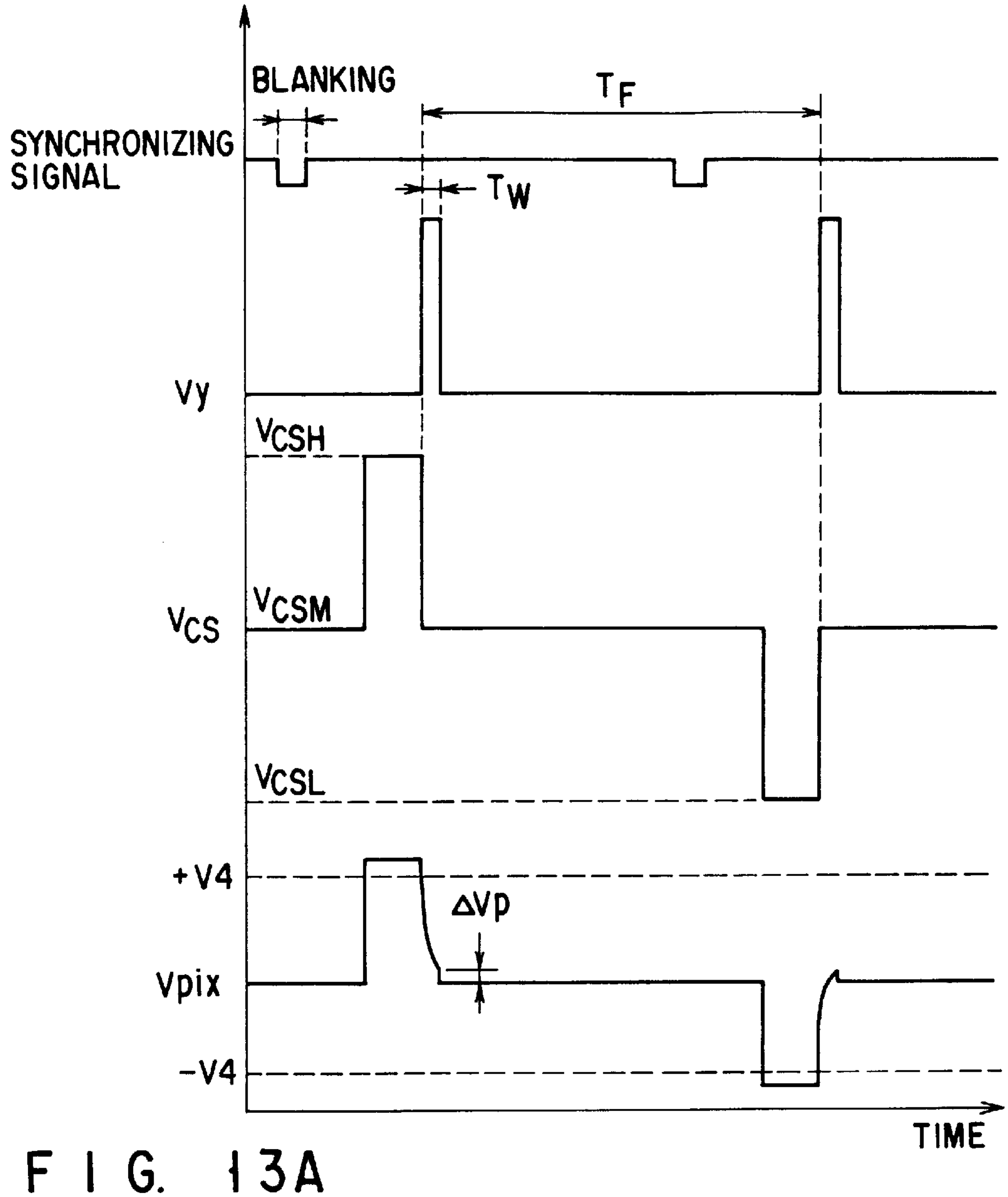
FIGS. 13A and 13B show waveforms at various sections when the erase signal is applied in the second embodiment.
Figure 13B:
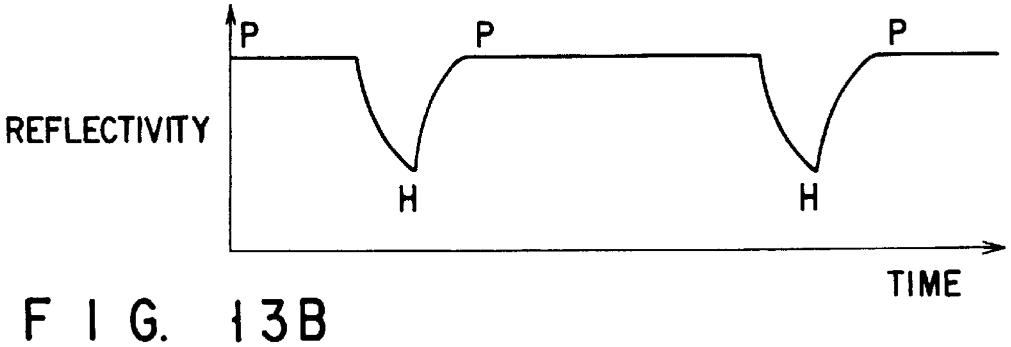

FIGS. 13A and 13B are timing charts with the same time scale for the waveforms at various sections and the reflectivity of the liquid-crystal layer when the liquid-crystal display device is driven. In the second embodiment, before the Y driver 7 supplies the scanning signal to the scanning line 4 to write the display signal to the individual pixel electrodes, the CS driver 11 supplies the erase signal $V_{CS}$ to the erase signal line 10, thereby initializing the device row by row. This can be understood from the timing of signal Vy and signal $V_{CS}$ in FIG. 13A.

When the erase signal $V_{CS}$ is applied, the phase of the liquid-crystal layer changes to the H phase once. Instantly returning the voltage of the erase signal $V_{CS}$ to the original value causes the phase of the liquid crystal to change from the H phase to the P phase, initializing the device row by row. To change the phase of the liquid crystal to the H phase, the value of the erase signal $V_{CS}$ is set so that the absolute value of the pixel electrode potential Vpix may be equal to or higher than the voltage V4 of FIG. 6. The pulse width of the erase signal VCS is set so as to be equal to or longer than the response time during which the phase of the liquid crystal changes to the H phase.

FIGS. 13A and 13B show an example of keeping the display in the P state before the rewriting in the same state even after the rewriting. ΔVp indicates a feed-through voltage. When the erase signal $V_{CS}$ is supplied before the display signal is written, this makes the scanning time independent of the response time of the liquid crystal, enabling a high-speed rewriting.

(Third Embodiment)

Hereinafter, a third embodiment of the present invention will be explained.

While the explanation of the first and second embodiments has been based mainly on the assumption that a binary display of black and white is made, the third embodiment is based on the assumption that a gray-level display is made.

The basic configuration of the liquid-crystal display device of the third embodiment is the same as that of FIG. 4 explained in the first embodiment. A repeated explanation of each component part and the basic operation will not be given here.

Figure 14:
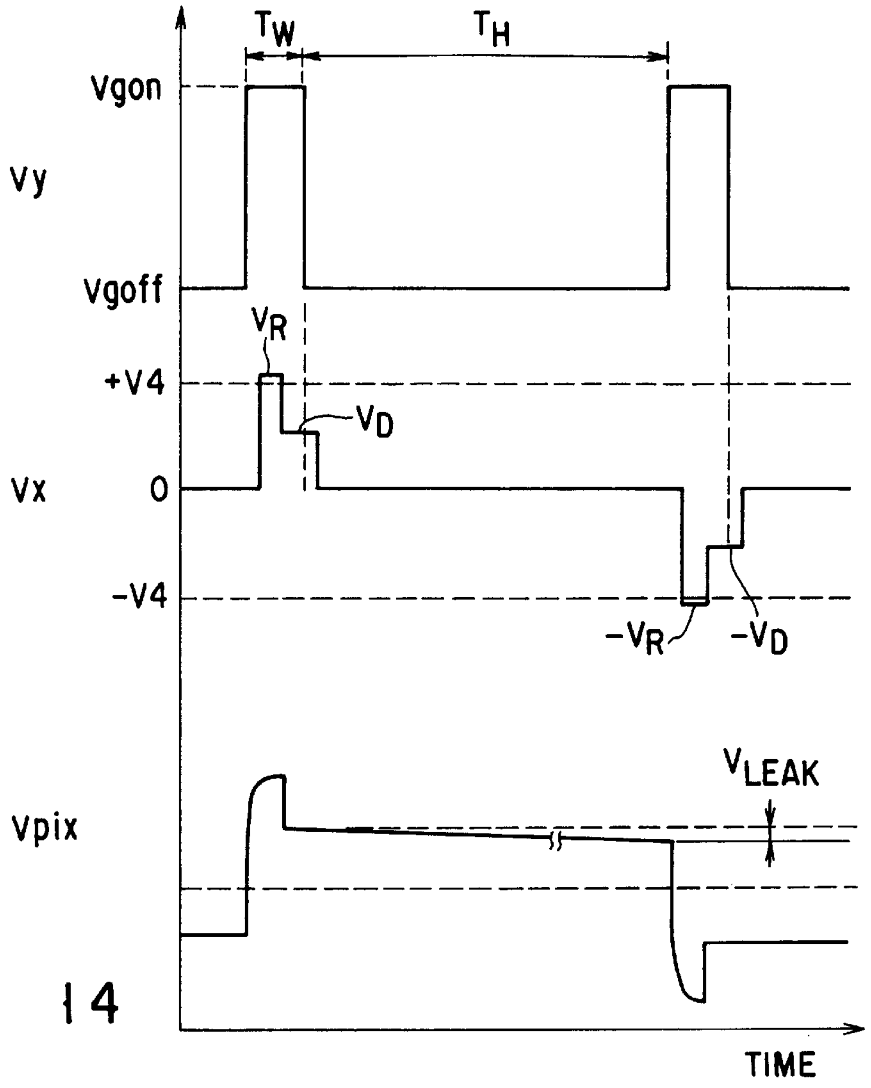
FIG. 14 shows waveforms at various sections when active matrix driving is effected in a third embodiment of the present invention.
Figure 15:
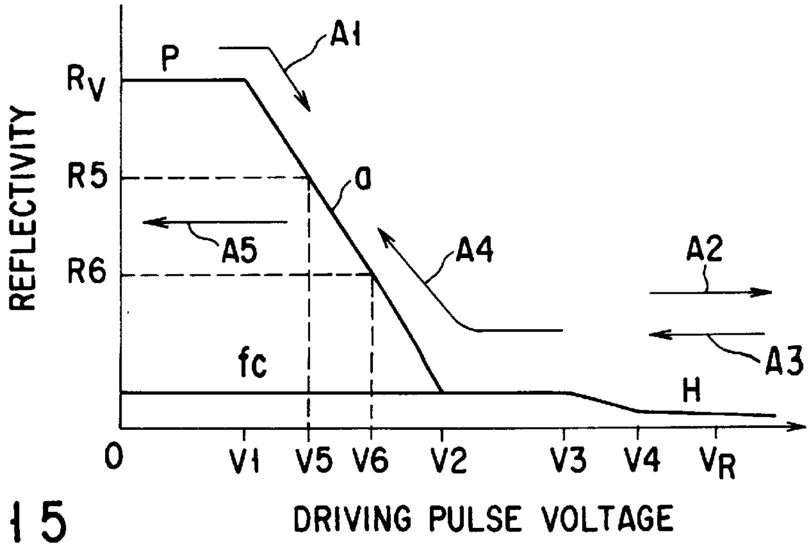
FIG. 15 shows the relationship between the applied voltage and the reflectivity for gray scale display.

FIG. 14 shows an output voltage waveform Vy from the Y driver 7 of FIG. 4, an output voltage waveform Vx from the XU driver 8*a* and XD driver 8*b*, and a voltage waveform Vpix applied to the liquid-crystal layer 1 between the pixel electrodes and the common electrode. In FIG. 14, $T_W$ indicates the writing period (scanning period) to the pixel electrode and $T_H$ indicates the holding period of the display signal. FIG. 15 shows the relationship between the voltage applied to the liquid-crystal layer 1 and the reflectivity.

As explained earlier, since cholesteric liquid crystal has a hysteresis characteristic inherently, the hysteresis characteristic causes a shift in the gray level, degrading the display quality. In active-matrix driving, to make a display without the influence of the hysteresis characteristic, a reset signal (voltage $V_R$, $-V_R$) is applied to the pixel electrode at the beginning of the scanning period. The reset signal is used to change the phase of cholesteric liquid crystal to the H phase and therefore is made equal to or higher than V4 (represented by arrow A1 and arrow A2 in FIG. 15). After the reset signal is applied, the display signal (voltage $V_D$, $-V_D$) is applied to the pixel electrode (represented by arrow A3 and arrow A4 in FIG. 15).

By changing the phase of the liquid crystal to the H phase using the reset signal and then applying the display signal, the liquid crystal surely has the characteristic indicated by "a" in FIG. 15, or is in a state where liquid-crystal molecules in the P state and those in the $f_c$ state are distributed with a certain probability. For example, when the voltage V5 of FIG. 15 is written into the pixel electrode as the display signal, the obtained reflectivity will be R5 (represented by arrow A5). In this way, by changing the phase of the liquid crystal to the H phase with the reset signal and applying the display signal, a high-quality display can be made with the desired gray level without the influence of the state of the liquid crystal before the rewriting.

In this case, after the writing time $T_W$ has elapsed, the display signal $V_D$ is applied to the pixel electrode at the time when the scanning signal goes off, which causes the writing voltage $V_D$ in the storage capacitor to still be held continuously. The holding voltage decreases because of $V_{LEAK}$ as time passes.

(Fourth Embodiment)

Hereinafter, a fourth embodiment of the present invention will be explained.

Like the third embodiment, the fourth embodiment is based on the assumption that a gray-level display is made.

The basic configuration of the liquid-crystal display device of the fourth embodiment is the same as that of FIG. 4 explained in the first embodiment. A repeated explanation of each component part and the basic operation will not be given here.

In normal active-matrix driving, the written potential has to be held during the time from when the display signal is written until the next display signal is written. Because of the influence of leakage current in the switching element or the liquid-crystal layer or of the capacitive coupling between the pixels and the signal lines, the pixel potential can fluctuate, resulting in a decrease in the display quality, such as a shift in the gray level.

The fourth embodiment enables a high-quality gray-level display without holding the pixel potential, making use of the memory characteristic of cholesteric liquid crystal.

Figure 16:
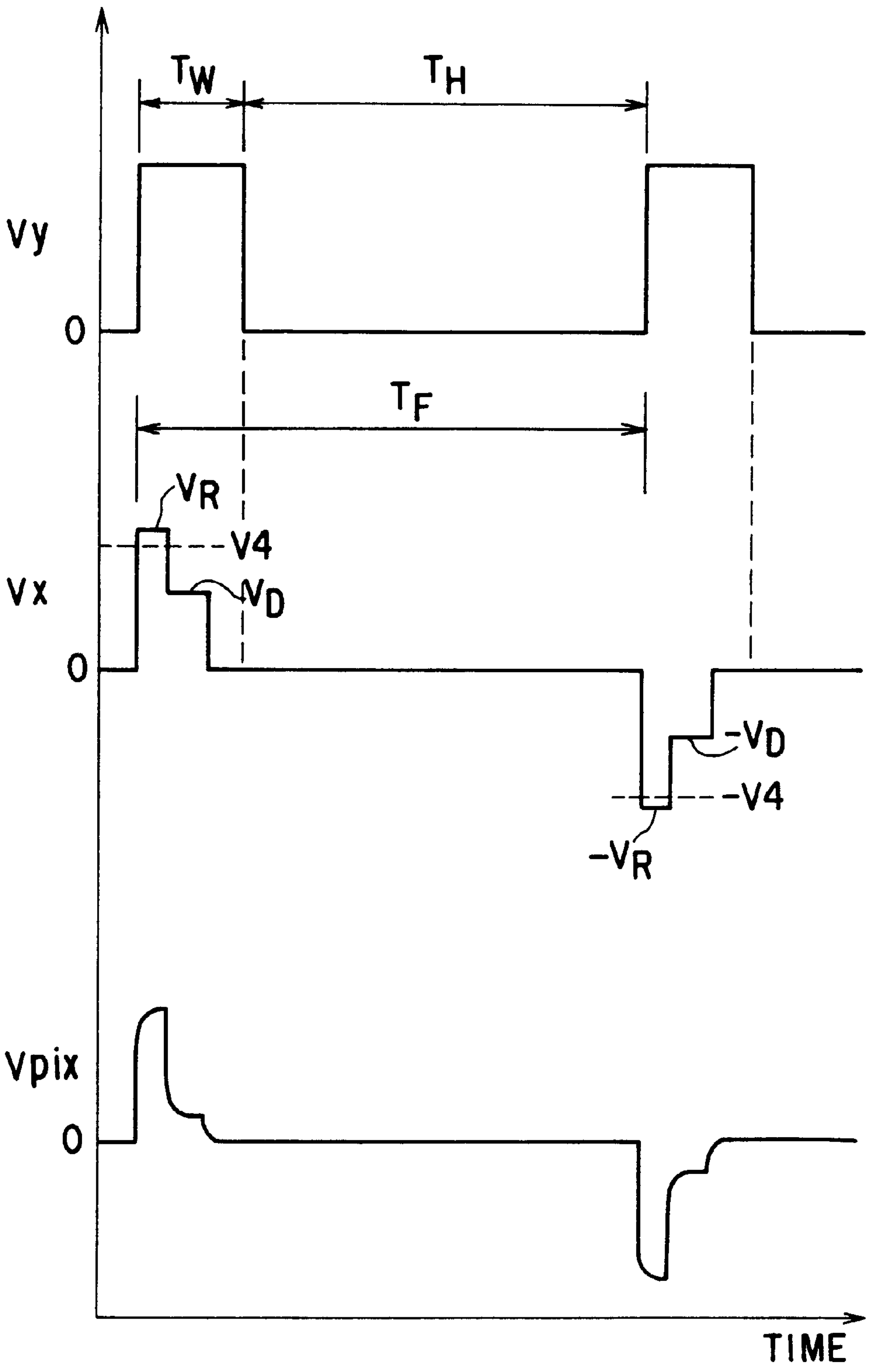
FIG. 16 shows waveforms at various sections in a fourth embodiment of the present invention.

FIG. 16 shows an output voltage waveform Vy from the Y driver 7 of FIG. 4, an output voltage waveform Vx from the XU driver 8*a* and XD driver 8*b*, and a voltage waveform Vpix applied to the liquid-crystal layer 1 between the pixel electrodes and the common electrode. In the figure, $T_F$ represents one frame period, $T_W$ indicates the writing period (scanning period) to the pixel electrode and TH indicates the holding period of the display signal.

First, at the beginning of the scanning period, the reset signal (voltage $V_R$, $-V_R$) is applied to the pixel electrode. The reset signal is used to change the phase of cholesteric liquid crystal to the H phase and is made equal to or higher than the voltage V4. After the reset signal is applied, the display signal (voltage $V_D$, $-V_D$) is applied to the pixel electrode and then the memory signal with a voltage of 0V is further applied during the scanning period.

By changing the phase of the liquid crystal to the H phase with the reset signal and then applying the display signal, the liquid crystal surely has the characteristic indicated by "a" in FIG. 15, or is in a state where liquid-crystal molecules in the P state and those in the $f_c$ state are distributed with a certain probability as described in the third embodiment. Then, with the liquid crystal in such an intermediate state, the memory signal with a voltage of 0V is applied, thereby holding the intermediate state.

From the viewpoint of the reliability of the liquid crystal, it is desirable that the positive and negative display signals should be applied on an equal basis. Therefore, with the driving method as shown in FIG. 16, the polarity of the display signal during the writing period ($T_W$) before the memory period ($T_H$) of a display signal must differ from that after the same memory period.

When the display signal changes frequently and the display screen is updated continually, the polarity of the display signal has only to be controlled sequentially in such a manner that the polarity of the display signal applied to the liquid-crystal panel is reversed each time the vertical synchronizing signal is supplied, for example.

However, when the display signal changes less frequently and the memory state lasts a long time, resulting in a temporary stop of the synchronizing signal from the system side, or the stop of the system itself, the polarity cannot be controlled sequentially. Therefore, to apply the positive and negative display signals on an equal basis, the polarity when the display signal goes into the memory state has to be memorized in the system.

Specifically, when the system changes from the memory state to the normal writing state, or the continuos screen update state, the control of the polarity is started on the basis of the polarity stored in the system. Although the reliability problem of the liquid crystal can be avoided, the system has to be provided with a polarity memory for that purpose.

Figure 17:
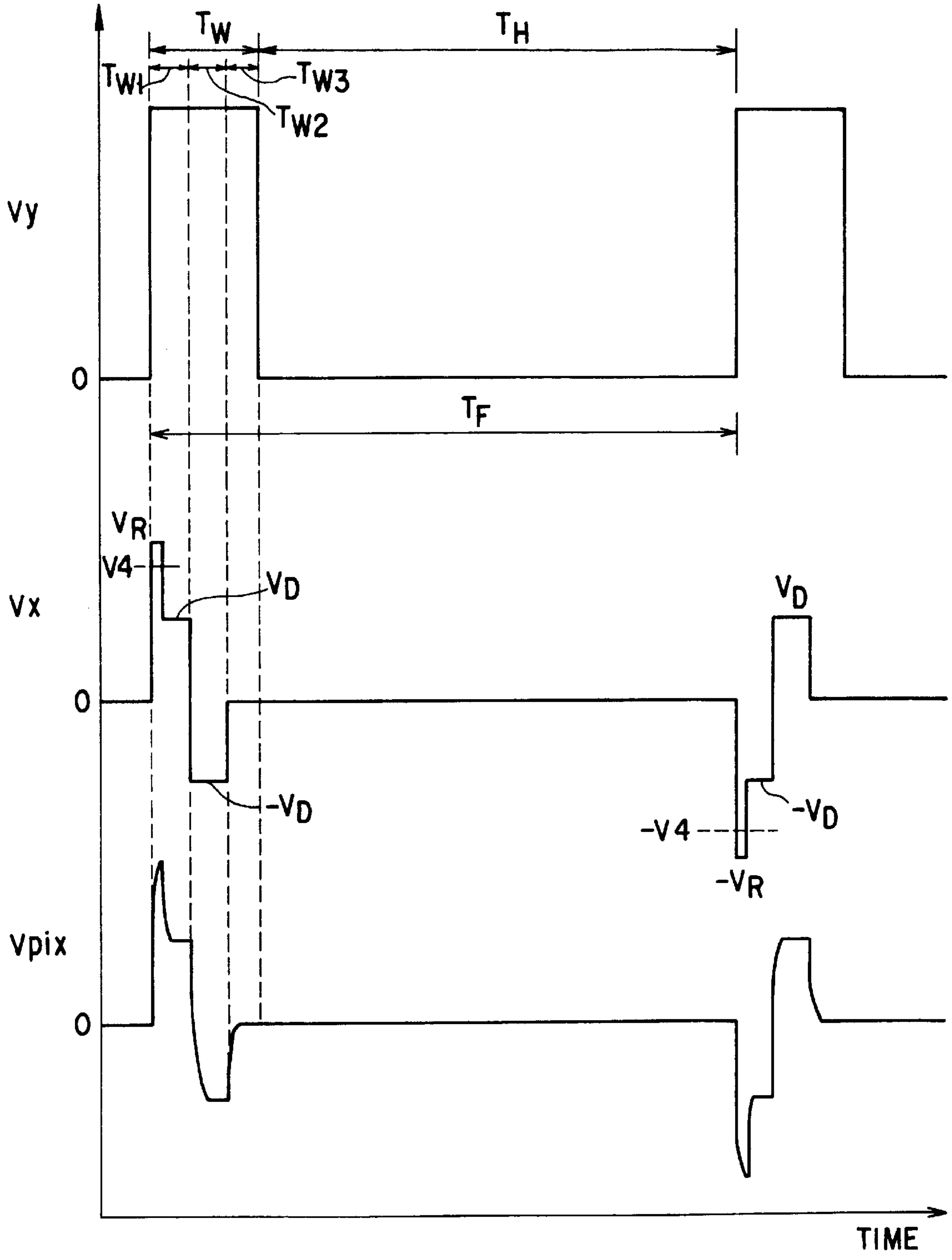
FIG. 17 is a waveform diagram to help explain an example of reversing the polarity of the display write voltage within a single write time in the fourth embodiment.

To simplify the polarity control by eliminating the polarity memory of the system, the positive display signal and negative display signal are applied during a single writing period. FIG. 17 shows driving waveforms when the display signal with both of the positive and negative polarities is written during a single writing period ($T_W$). The reference symbols in FIG. 17 have the same meaning as in FIG. 16. $T_{W1}$, $T_{W2}$, and $T_{W3}$ are the writing period of the positive display signal in the writing period $T_W$ to the pixel electrode, the writing period of the negative display signal, and the memory voltage applying period, respectively.

When as shown in FIG. 17, the positive display signal and the negative display signal are applied in the relationship fulfilling $T_{W1} \fallingdotseq T_{W2}$ during a single writing period $T_W$, both of the positive and negative polarities are applied to the liquid crystal on an equal basis, which makes it unnecessary for the system to memorize the polarity, simplifying the control of polarity.

Figure 18:
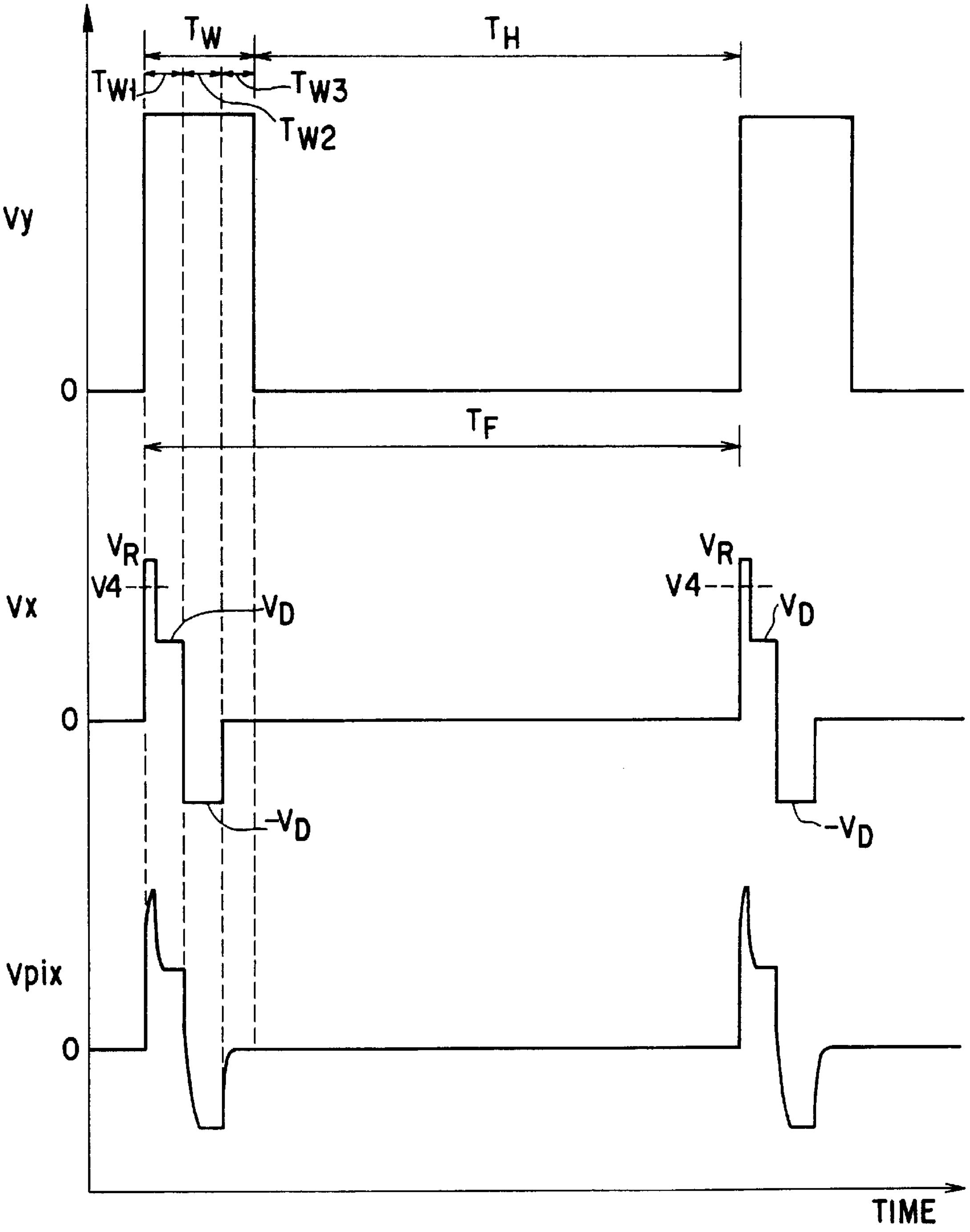
FIG. 18 is a waveform diagram to help explain a case where the polarity of write start is always made positive in the fourth embodiment.

To apply both of the positive and negative polarities on an equal basis in a single writing operation, the polarity at the writing start may be constantly fixed to the positive polarity or the negative polarity as shown in FIG. 18.

As described above, use of the memorizing capability of cholesteric liquid crystal enables a high-quality display with the desired gray level without holding the pixel potential. Because the pixel potential need not be held, when the display image remains unchanged, for example, the display signal need not be rewritten frame by frame, resulting in a remarkable reduction in the power consumption.

Although it is desirable that the memory signal should be applied after the amount of reflected light has become constant as a result of the application of the display signal, the memory signal may be applied before the amount of reflected light has become constant or while the liquid crystal is in the course of responding.

Figure 19A:
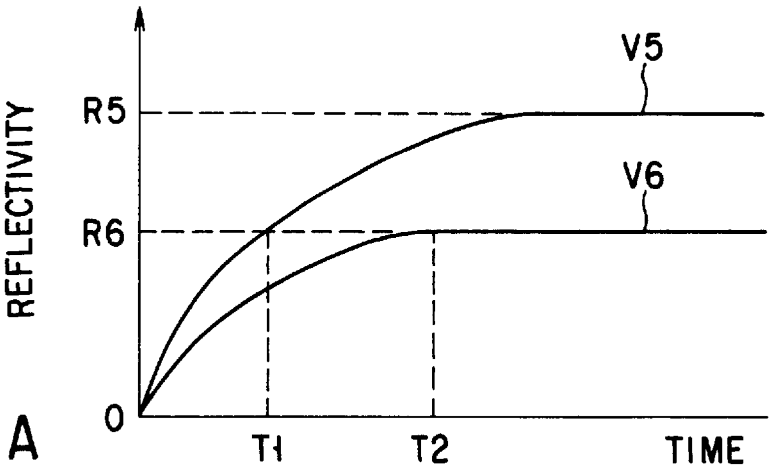
FIGS. 19A to 19C are diagrams to help explain the comparison of a case where the display signal is applied after the amount of reflected light has become constant with a case where the display signal is applied before the amount of reflected light has become constant, FIG. 19A showing the relationship between time and the reflectivity, and FIGS. 19B and 19C being timing charts for the scanning signal and display signal, respectively.
Figure 19B:
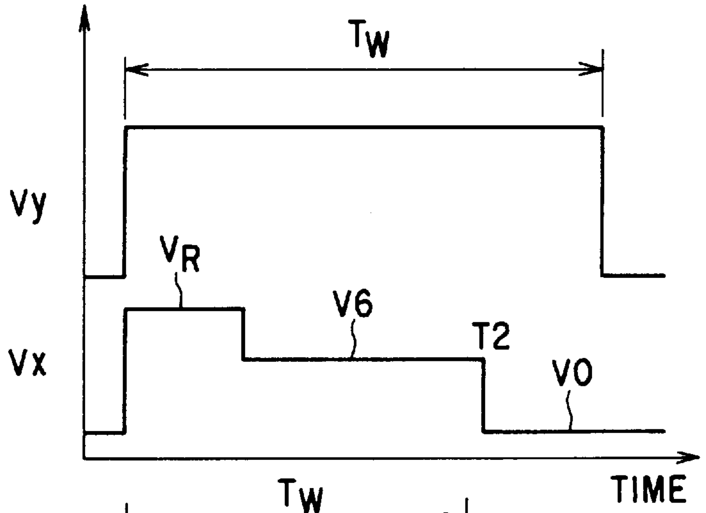
Figure 19C:
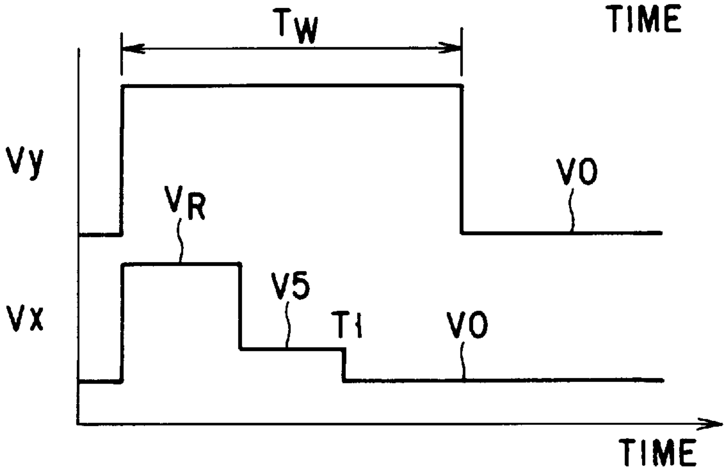

FIGS. 19A to 19C show a case where the display signal is applied after the amount of reflected light has become constant and a case where the display signal is applied before the amount of reflected light has become constant. For instance, a case where an attempt is made to obtain the reflectivity R6 of FIG. 15 will be explained. When the display signal is applied after the amount of reflected light has become constant, the voltage V6 is applied as the display signal and the memory signal is applied at the time when the reflectivity has reached a constant value of R6, that is, at the time T2 of FIG. 19A.

In contrast, when the display signal is applied before the amount of reflected light has become constant, the voltage V5 is applied as the display signal and the memory signal is applied at the time when the reflectivity has reached a constant value of R6, that is, at the time T1 of FIG. 19A. In this way, by applying the memory signal before the amount of reflected light has become constant or while the liquid crystal is in the course of responding, the writing period can be shortened.

While in the embodiments, a liquid crystal presenting the cholesteric phase, such as PSCT, has been used, other liquid crystals may be used. For instance, a liquid crystal whose reflectivity or transmittance with respect to the applied voltage presents a hysteresis characteristic, such as ferroelectric liquid crystal may be used.

As described above, according to the present invention, with a liquid-crystal display device using liquid crystal whose reflectivity or transmittance with respect to the applied voltage presents a hysteresis characteristic and a driving method thereof, it is possible to shorten the rewriting time, reduce the power consumption, and achieve a higher-quality display.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A liquid-crystal display device comprising:

a first substrate having a first main surface;

a plurality of pixel electrodes arranged in rows and columns on said first main surface of said first substrate;

a second substrate that has a second main surface and is provided so that said second main surface faces said first main surface of said first substrate;

a common electrode that is formed on said second main surface of said second substrate and has a portion facing said plurality of pixel electrodes;

a liquid-crystal layer which is sandwiched between said plurality of pixel electrodes and said common electrode, which has a reflectivity or transmittance that varies according to a first state where a direction of a normal to each twist of liquid crystal in said liquid crystal layer is the same, a second state where said direction of said normal to each twist of said liquid crystal is at random, and a third state where a spiral structure of said liquid crystal has been untied, which has a reflectivity or transmittance with respect to an applied voltage which presents a hysteresis characteristic, and which has an insensitive voltage region where said applied voltage is zero or in the vicinity of zero and a factor other than said applied voltage determines whether to take either said first state or said second state;

a plurality of scanning lines formed on said first main surface of said first substrate so as to correspond to said rows;

a plurality of signal lines formed on said first main surface of said first substrate so as to correspond to said columns;

a plurality of switch elements provided at intersections of said plurality of scanning lines and said plurality of signal lines in a one-to-one ratio, each of said plurality of switch elements having a conducting path and a control terminal that controls conduction in said conducting path, a first end of said conducting path being connected to a corresponding one of said plurality of signal lines, a second end of said conducting path being connected to a corresponding one of said plurality of pixel electrodes, and said control terminal being connected to a corresponding one of said plurality of scanning lines;

a plurality of capacitive elements each having a first end which is directly connected to said plurality of pixel electrodes in a one-to-one ratio;

a plurality of storage capacitor lines formed so as to correspond to said rows, each of said plurality of storage capacitor lines being connected to a second end of each of said plurality of capacitive elements included in a corresponding one of said rows;

a scanning-line driver for supplying a scanning signal to each of said plurality of scanning lines;

a signal-line driver for supplying a display signal to each of said plurality of signal lines; and control means for controlling a potential of a corresponding one of said plurality of pixel electrodes so that said potential falls in an insensitive voltage region which is zero or in the vicinity of zero, after said display signal has been applied and written into said corresponding one of said plurality of pixel electrodes.

2. A liquid-crystal display device according to claim 1, wherein said liquid-crystal layer is formed of cholesteric liquid crystal and said first, said second, and said third state corresponds to a planar state, a focal conic state, and a homeotoropic state of said cholesteric liquid crystal in this order.

3. A liquid-crystal display device according to claim 1, wherein said control means controls a voltage of said scanning signal so that a time needed for a potential difference between a corresponding one of said plurality of pixel electrodes and said common electrode to fall within said insensitive voltage region is larger than a response time of said liquid crystal.

4. A liquid-crystal display device according to claim 1, wherein said control means controls an impedance of said switch element by controlling a voltage of said scanning signal from said scanning-line driver.

5. A liquid-crystal display device according to claim 4, wherein said control means further includes switching means for bringing a corresponding one of said plurality of signal lines into a low impedance after the corresponding one of said plurality of signal lines has written said display signal into a corresponding one of said plurality of pixel electrodes.

6. A liquid-crystal display device according to claim 1, further comprising a display synchronizing signal generator circuit for generating a specific synchronizing signal, wherein said signal-line driver outputs said display signal on a basis of said specific synchronizing signal, and said display synchronizing signal generator circuit stops an output of said synchronizing signal when said display signal remains unchanged for one frame or more, which causes said signal-line driver to stop an output of said display signal and said scanning-line driver to stop an output of said scanning signal, and then said display synchronizing signal generator circuit generates said specific synchronizing signal immediately when said display signal changes again, which causes said signal-line driver to start said output of said display signal again.

7. A liquid-crystal display device according to claim 6, further comprising reset voltage applying means for applying a reset voltage for changing a state of said liquid-crystal layer to said third state to said plurality of storage capacitor lines for a time equal to or longer than a response time of said liquid crystal during an active period of said synchronizing signal, starting at a beginning of said period.

8. A liquid-crystal display device according to claim 1, wherein said signal-line driver supplies a reset voltage for changing a state of said liquid-crystal layer to said third state and thereafter supplies an arbitrary voltage for changing said state of said liquid-crystal layer to said second state during an active period of said scanning signal.

9. A liquid-crystal display device according to claim 8, wherein said signal-line driver brings said display signal into said insensitive voltage region after said liquid-crystal layer has been changed to said second state.

10. A liquid-crystal display device according to claim 1, wherein said signal-line driver supplies a reset voltage for changing a state of said liquid-crystal layer to said third state and thereafter supplies an arbitrary voltage for changing said state of said liquid-crystal layer to said second state, and then brings said arbitrary voltage into said insensitive voltage region before said liquid-crystal layer has responded completely during an active period of said scanning signal.

11. A liquid-crystal display device according to claim 1, wherein said display signal which includes the same number of positive polarity peaks and negative polarity peaks is applied to said pixel electrodes during an active period of said scanning signal.

12. A liquid-crystal display device comprising:

a first substrate having a first main surface;

a plurality of pixel electrodes arranged in rows and columns on said first main surface of said first substrate;

a second substrate that has a second main surface and is provided so that said second main surface faces said first main surface of said first substrate;

a common electrode that is formed on said second main surface of said second substrate and has a portion facing said plurality of pixel electrodes;

a liquid-crystal layer which is sandwiched between said plurality of pixel electrodes and said common electrode, which has a reflectivity or transmittance that varies according to a first state where a direction of a normal to each twist of liquid crystal in said liquid crystal layer is the same, a second state where said direction of said normal to each twist of said liquid crystal is at random, and a third state where a spiral structure of said liquid crystal has been untied, which has a reflectivity or transmittance with respect to an applied voltage which presents a hysteresis characteristic, and which has an insensitive voltage region where said applied voltage is zero or in the vicinity of zero and a factor other than said applied voltage determines whether to take either said first state or said second state;

a plurality of scanning lines formed on said first main surface of said first substrate so as to correspond to said rows;

a plurality of signal lines formed on said first main surface of said first substrate so as to correspond to said columns;

a plurality of switch elements provided at intersections of said plurality of scanning lines and said plurality of signal lines in a one-to-one ratio, each of said plurality of switch elements having a conducting path and a control terminal that controls conduction in said conducting path, a first end of said conducting path being connected to a corresponding one of said plurality of signal lines, a second end of said conducting path being connected to a corresponding one of said plurality of pixel electrodes, and said control terminal being connected to a corresponding one of said plurality of scanning lines;

a plurality of capacitive elements each having a first end which is directly connected to said plurality of pixel electrodes in a one-to-one ratio;

a plurality of storage capacitor lines formed so as to correspond to said rows, each of said plurality of storage capacitor lines being connected to a second end of each of said plurality of capacitive elements included in a corresponding one of said rows;

a scanning-line driver for supplying a scanning signal to each of said plurality of scanning lines;

a signal-line driver for supplying a display signal to each of said plurality of signal lines;

control means for controlling a potential of a corresponding one of said plurality of pixel electrodes so that said potential falls in an insensitive voltage region which is zero or in the vicinity of zero, after said display signal has been applied and written into said corresponding one of said plurality of pixel electrodes; and a storage-capacitor line driver for supplying a reset voltage for bringing said liquid-crystal layer into said third state to each of said plurality of storage capacitor lines provided for each of said rows, wherein said reset voltage is supplied to said corresponding one of said plurality of storage capacitor lines immediately before said scanning signal is supplied to said corresponding one of said plurality of scanning lines.

13. A liquid-crystal display device according to claim 12, wherein said liquid-crystal layer is formed of cholesteric liquid crystal and said first, said second, and said third state corresponds to a planar state, a focal conic state, and a homeotoropic state of said cholesteric liquid crystal in this order.

14. A liquid-crystal display device according to claim 12, wherein said control means controls a voltage of said scanning signal so that a time needed for a potential difference between a corresponding one of said plurality of pixel electrodes and said common electrode to fall within said insensitive voltage region is larger than a response time of said liquid crystal.

15. A liquid-crystal display device according to claim 12, wherein said control means controls an impedance of said switch element by controlling a voltage of said scanning signal from said scanning-line driver.

16. A method of driving a liquid-crystal display device having a plurality of pixel electrodes arranged in rows and columns; a common electrode facing said plurality of pixel electrodes; a liquid-crystal layer which is sandwiched between said plurality of pixel electrodes and said common electrode, which has a reflectivity or transmittance that varies according to a first state where a direction of a normal to each twist of liquid crystal in said liquid crystal layer is the same, a second state where said direction of said normal to each twist of said liquid crystal is at random, and a third state where a spiral structure of said liquid crystal has been untied, which has a reflectivity or transmittance with respect to an applied voltage which presents a hysteresis characteristic, and which has an insensitive voltage region where said applied voltage is zero or in the vicinity of zero and a factor other than said applied voltage determines whether to take either said first state or said second state; a signal line driver for selecting said plurality of pixel electrodes column by column and supplying a display signal via a corresponding one of a plurality of signal lines, and a scanning-line driver for selecting said plurality of pixel electrodes row by row and driving corresponding switch elements with a scanning signal from said corresponding one of said plurality of scanning lines to apply said display signal to a corresponding one of said plurality of pixel electrodes, said method comprising:

causing said signal-line driver and said scanning-line driver to write said display signal into a corresponding one of said plurality of pixel electrodes; and bringing a potential difference between said corresponding one of said plurality of pixel electrodes and said common electrode into said insensitive voltage region after the step of writing said display signal has been completed.

17. A method of driving a liquid-crystal display device according to claim 16, wherein said liquid-crystal layer is formed of cholesteric liquid crystal and said first, said second, and said third state corresponds to a planar state, a focal conic state, and a homeotoropic state of said cholesteric liquid crystal in this order.

18. A method of driving a liquid-crystal display device according to claim 16, wherein said step of bringing a potential difference between said corresponding one of said plurality of pixel electrodes and said common electrode into said insensitive voltage region includes the step of controlling a voltage of said scanning signal so that a time needed for said potential difference between said corresponding one of said pixel electrodes and said common electrode to fall within said insensitive voltage region is larger than a response time of said liquid crystal.

19. A method of driving a liquid-crystal display device according to claim 16, wherein said step of bringing a potential difference between the corresponding one of said plurality of pixel electrodes and said common electrode into said insensitive voltage region includes the step of controlling an impedance of said switch element by controlling a voltage of said scanning signal from said scanning-line driver.

20. A method of driving a liquid-crystal display device according to claim 16, further comprising the step of causing said display signal to supply a reset voltage for changing a state of said liquid-crystal layer to said third state and thereafter supply an arbitrary voltage for changing said state of said liquid-crystal layer to said second state during an active period of said scanning signal.

21. A liquid-crystal display device according to claim 1, wherein said first state and said second state are used as corresponding to binary variables of said display signal, respectively.

22. A liquid-crystal display device according to claim 12, wherein said first state and said second state are used as corresponding to binary valuables of said display signal, respectively.

* * * * *